(12) United States Patent
Egashira et al.

(10) Patent No.: US 7,957,480 B2
(45) Date of Patent: Jun. 7, 2011

(54) WIRELESS COMMUNICATION METHOD AND WIRELESS COMMUNICATION APPARATUS

(75) Inventors: Yoshimasa Egashira, Yokohama (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 521 days.

(21) Appl. No.: 12/140,613

(22) Filed: Jun. 17, 2008

(65) Prior Publication Data

US 2008/0310534 A1    Dec. 18, 2008

(30) Foreign Application Priority Data

Jun. 18, 2007   (JP) .................... 2007-160422

(51) Int. Cl.
*H04K 1/10* (2006.01)
*H04L 27/28* (2006.01)
*H04L 27/00* (2006.01)

(52) U.S. Cl. .................. 375/260; 375/259; 370/208

(58) Field of Classification Search .......... 375/260; 370/208

See application file for complete search history.

(56) References Cited

U.S. PATENT DOCUMENTS

| | | | | |
|---|---|---|---|---|
| 4,945,549 A | * | 7/1990 | Simon et al. .................. | 375/280 |
| 2005/0185699 A1 | * | 8/2005 | Feher ............................ | 375/146 |
| 2007/0201351 A1 | | 8/2007 | Egashira et al. | |
| 2008/0037410 A1 | | 2/2008 | Egashira et al. | |
| 2009/0268825 A1 | * | 10/2009 | Sakai et al. .................. | 375/260 |

FOREIGN PATENT DOCUMENTS

JP    2001-119364    4/2001

OTHER PUBLICATIONS

Yoshimasa Egashira, et al., "A Novel IQ imbalance Compensation Scheme using Pilot-signals for OFDM", Proceedings of the 2006 IEICE Communications Society Conference, Sep. 7, 2006, p. 361 and 3 cover pages.

* cited by examiner

*Primary Examiner* — David C. Payne
*Assistant Examiner* — Erin M File
(74) *Attorney, Agent, or Firm* — Oblon, Spivak, McClelland, Maier & Neustadt, L.L.P.

(57) ABSTRACT

A wireless communication apparatus generates transmission signal including first and second pilot signal sequences allocated to first and second frequencies symmetrically located in relation to a center frequency, and third and fourth pilot signal sequences allocated to third and fourth frequencies symmetrically located in relation to the center frequency, quadrature-modulates the transmission signal, to obtain a quadrature modulation signal, quadrature-demodulates the quadrature modulation signal, to obtain a reception signal, extracts first to fourth pilot signal sequences from the reception signal, estimates a first transfer characteristic concerning first and second frequency by using first and second pilot signal sequences, estimates a second transfer characteristic concerning third and fourth frequencies using third and the fourth pilot signal sequences, generates a third transfer characteristic from which an influence of transmission IQ imbalance is removed by using first and second transfer characteristic, and estimates, from the third transfer characteristic, reception IQ imbalance characteristic.

33 Claims, 12 Drawing Sheets

| | | | | | | |
|---|---|---|---|---|---|---|
| | ⋮ | ⋮ | ⋮ | ⋮ | ⋮ | ⋮ |
| | $z_{tx}(+k_2+1)$ | $d_{tx}(+k_2+1,1)$ | $d_{tx}(+k_2+1,2)$ | ...... | $d_{tx}(+k_2+1,n)$ | ...... |
| $+k_2$ | $z_{tx}(+k_2)$ | $p_{tx}(+k_2,1)$ | $p_{tx}(+k_2,2)$ | ...... | $p_{tx}(+k_2,n)$ | ...... |
| | $z_{tx}(+k_2-1)$ | $d_{tx}(+k_2-1,1)$ | $d_{tx}(+k_2-1,2)$ | ...... | $d_{tx}(+k_2-1,n)$ | ...... |
| | ⋮ | ⋮ | ⋮ | ⋮ | ⋮ | ⋮ |
| | $z_{tx}(+k_1+1)$ | $d_{tx}(+k_1+1,1)$ | $d_{tx}(+k_1+1,2)$ | ...... | $d_{tx}(+k_1+1,n)$ | ...... |
| $+k_1$ | $z_{tx}(+k_1)$ | $p_{tx}(+k_1,1)$ | $p_{tx}(+k_1,2)$ | ...... | $p_{tx}(+k_1,n)$ | ...... |
| | $z_{tx}(+k_1-1)$ | $d_{tx}(+k_1-1,1)$ | $d_{tx}(+k_1-1,2)$ | ...... | $d_{tx}(+k_1-1,n)$ | ...... |
| | ⋮ | ⋮ | ⋮ | ⋮ | ⋮ | ⋮ |
| | $z_{tx}(+1)$ | $d_{tx}(+1,1)$ | $d_{tx}(+1,2)$ | ...... | $d_{tx}(+1,n)$ | ...... |

Subcarrier number 0

| | | | | | | |
|---|---|---|---|---|---|---|
| | $z_{tx}(-1)$ | $d_{tx}(-1,1)$ | $d_{tx}(-1,2)$ | ...... | $d_{tx}(-1,n)$ | ...... |
| | ⋮ | ⋮ | ⋮ | ⋮ | ⋮ | ⋮ |
| | $z_{tx}(-k_1+1)$ | $d_{tx}(-k_1+1,1)$ | $d_{tx}(-k_1+1,2)$ | ...... | $d_{tx}(-k_1+1,n)$ | ...... |
| $-k_1$ | $z_{tx}(-k_1)$ | $p_{tx}(-k_1,1)$ | $p_{tx}(-k_1,2)$ | ...... | $p_{tx}(-k_1,n)$ | ...... |
| | $z_{tx}(-k_1-1)$ | $d_{tx}(-k_1-1,1)$ | $d_{tx}(-k_1-1,2)$ | ...... | $d_{tx}(-k_1-1,n)$ | ...... |
| | ⋮ | ⋮ | ⋮ | ⋮ | ⋮ | ⋮ |
| | $z_{tx}(-k_2+1)$ | $d_{tx}(-k_2+1,1)$ | $d_{tx}(-k_2+1,2)$ | ...... | $d_{tx}(-k_2+1,n)$ | ...... |
| $-k_2$ | $z_{tx}(-k_2)$ | $p_{tx}(-k_2,1)$ | $p_{tx}(-k_2,2)$ | ...... | $p_{tx}(-k_2,n)$ | ...... |
| | $z_{tx}(-k_2-1)$ | $d_{tx}(-k_2-1,1)$ | $d_{tx}(-k_2-1,2)$ | ...... | $d_{tx}(-k_2-1,n)$ | ...... |
| | ⋮ | ⋮ | ⋮ | ⋮ | ⋮ | ⋮ |

Channel estimating preamble | First symbol | Second symbol | ⋯ | n-th symbol | ⋯

FIG. 4

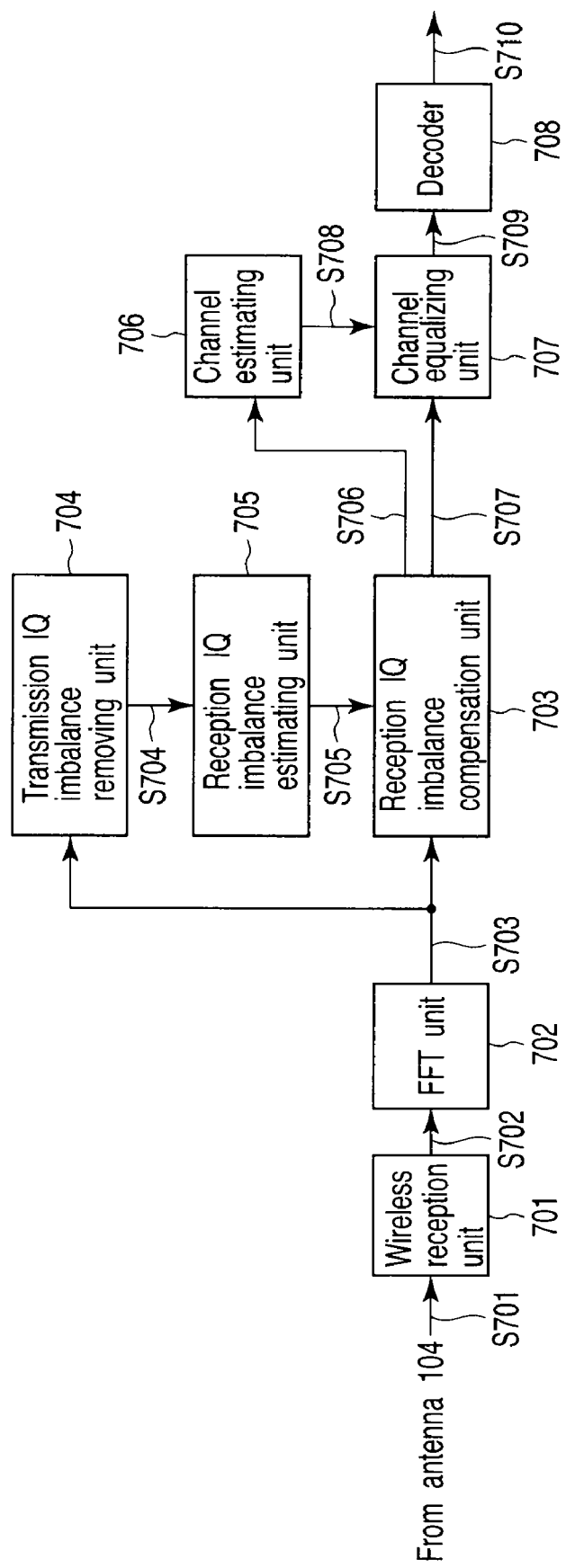
F I G. 7

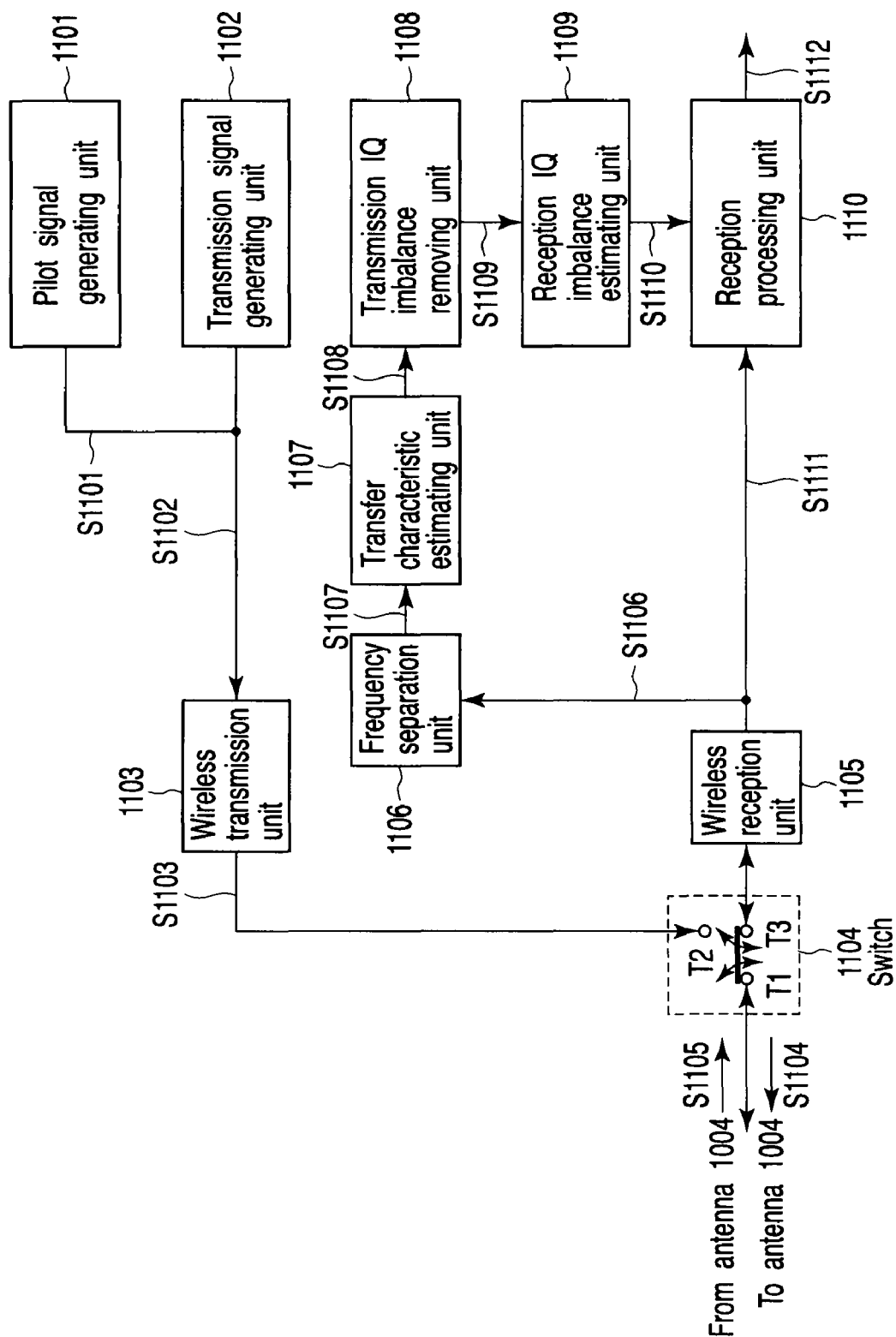
F I G. 11

WIRELESS COMMUNICATION METHOD AND WIRELESS COMMUNICATION APPARATUS

CROSS-REFERENCE TO RELATED APPLICATIONS

This application is based upon and claims the benefit of priority from prior Japanese Patent Application No. 2007-160422, filed Jun. 18, 2007, the entire contents of which are incorporated herein by reference.

BACKGROUND OF THE INVENTION

1. Field of the Invention

The present invention relates to an Orthogonal Frequency Division Multiplexing (OFDM) wireless communication system.

2. Description of the Related Art

A difference in propagation delay time of a multi-path propagation path cannot be neglected when a frequency bandwidth used in communication is expanded to enhance a wireless communication speed. In an environment of incoming signals having the propagation delay times, a waveform distortion caused by inter-code interference becomes a main factor of deterioration of communication quality. In such environments, an Orthogonal Frequency Division Multiplexing (hereinafter abbreviated as OFDM) system is well known as a system in which the waveform distortion caused by the inter-code interference can be compensated even if the signals having the propagation delay times are received.

Because a signal becomes a complex signal in the OFDM transmission scheme, it is necessary that a quadrature modulator and a quadrature demodulator be used in a transmitter and a receiver respectively. In order to correctly produce an in-phase component signal and an orthogonal component signal during transmission, it is necessary to produce the signals whose phases are shifted from each other by 90 degrees. In order to correctly extract the in-phase component signal and the orthogonal component signal during reception, it is necessary that local signals whose phases are shifted from each other by 90 degrees be produced to multiply the local signals by the reception signals respectively. In the case where a gain is applied to the in-phase component signal and the orthogonal component signal by a filter or an amplifier, it is necessary to apply the equal gain to the in-phase component and the orthogonal component. However, generally a difference in amplitude between the in-phase component and the orthogonal component, or a phase error is generated in a 90-degree phase shifter. Hereinafter such incompleteness of an analog circuit is referred to as IQ imbalance.

When the IQ imbalance is generated, two subcarrier signals located on a frequency axis in symmetrical relation to a center frequency interfere with each other in plural subcarriers of the OFDM signal, which largely restricts transmission performance. Therefore, for example, JP-A 2001-119364 (KOKAI) proposes a technique in which an interference amount of the subcarriers symmetrically located in relation to the center frequency is estimated and compensation is performed based on the estimate result.

However, in the technique disclosed in JP-A 2001-119364 (KOKAI), because the interference amount in which both the IQ imbalance and a channel characteristic are combined is estimated, an influence of the individual IQ imbalance generated by the quadrature modulation cannot be learned. Therefore, the estimate processing is required in each frame, in the case where signals are received from unspecified number terminals or in the case where a channel fluctuation cannot be neglected. Additionally, in the conventional technique, because the influence of the individual IQ imbalance generated by the quadrature modulation cannot be learned, compensation of the IQ imbalance generated by the quadrature modulation cannot be performed to the transmission signal.

Additionally, in the conventional technique, a channel estimating known signal having a length double usually necessary length be transmitted to all the subcarriers in which data is transmitted, which results in a problem of increased overhead.

BRIEF SUMMARY OF THE INVENTION

According to embodiments of the present invention, a wireless communication apparatus obtains a quadrature modulation signal including (a) a first pilot signal sequence and a second pilot signal sequence which are allocated to a first frequency and a second frequency symmetrically located in relation to a center frequency of a plurality of frequencies, and (b) a third pilot signal sequence and a fourth pilot signal sequence which are allocated to a third frequency and a fourth frequency symmetrically located in relation to the center frequency;

performs quadrature demodulation on the quadrature modulation signal with a quadrature demodulator, to obtain a reception signal;

extracts, from the reception signal, the first pilot signal sequence, the second pilot signal sequence, the third pilot signal sequence, and the fourth pilot signal sequence;

estimates a first transfer characteristic concerning the first frequency and the second frequency by using the first pilot signal sequence and the second pilot signal sequence which are extracted;

estimates a second transfer characteristic concerning the third frequency and the fourth frequency by using the third pilot signal sequence and the fourth pilot signal sequence which are extracted;

generates a third transfer characteristic from which an influence of transmission IQ imbalance in a quadrature modulator is removed, by using the first transfer characteristic and the second transfer characteristic;

generates a fourth transfer characteristic from which an influence of reception IQ imbalance in the quadrature demodulator is removed, by using the first transfer characteristic and the second transfer characteristic;

estimates, from the third transfer characteristic, a reception IQ imbalance characteristic; and estimates, from the fourth transfer characteristic, a transmission IQ imbalance characteristic.

BRIEF DESCRIPTION OF THE SEVERAL VIEWS OF THE DRAWING

FIG. 4 shows a frame configuration of a transmission OFDM signal;

FIG. 7 shows a configuration of an OFDM signal receiver according to the second embodiment;

FIG. 11 shows a configuration of a wireless communication apparatus according to the fifth embodiment;

DETAILED DESCRIPTION OF THE INVENTION

Embodiments of the invention will be described below with reference to the drawings.

First Embodiment

Figure 1:
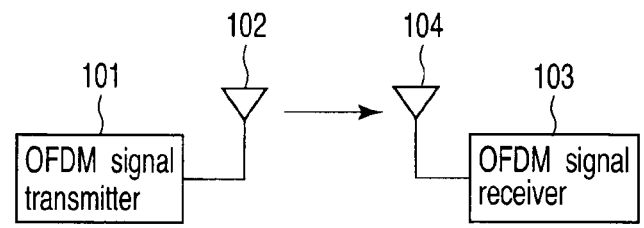
FIG. 1 shows a configuration of an OFDM communication system according to first, second, third, and fourth embodiments of the invention.

As shown in FIG. 1, in an OFDM wireless communication system according to a first embodiment of the invention, an OFDM transmitter 101 including a transmitting antenna 102 transmits an OFDM signal. An OFDM receiver 103 including a receiving antenna 104 receives the transmitted OFDM signal. In the first embodiment, each of the OFDM transmitter 101 and the OFDM receiver 103 includes the one antenna. However, the OFDM transmitter may include the plural transmitting antennas and the OFDM receiver may includes the plural receiving antennas.

(OFDM Transmitter)

Figure 2:
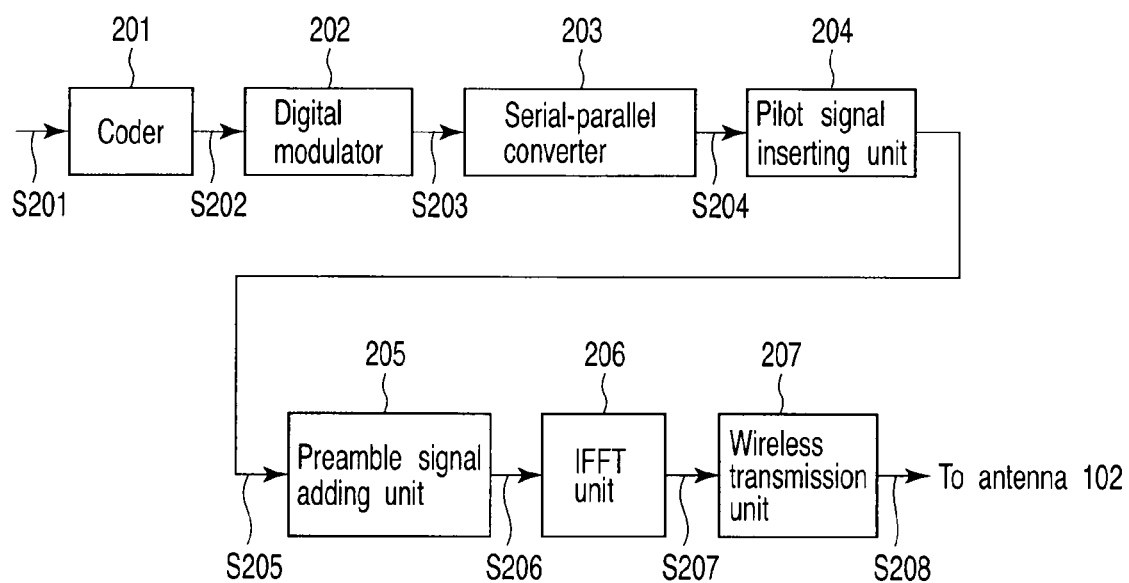
FIG. 2 shows a configuration of an OFDM signal transmitter according to first, second, third, and fourth embodiments of the invention.

Referring to FIG. 2, the OFDM transmitter 101 includes a coder 201, a digital modulator 202, a serial-parallel converter 203, a pilot signal inserting unit 204, a preamble signal adding unit 205, an IFFT (Inverse Fast Fourier Transform) unit 206, and a wireless transmission unit 207 having a quadrature modulator.

The coder 201 codes a fed transmission data S201 to supply a coded data S202. The digital modulator 202 performs digital modulation such as BPSK (Binary Phase Shift Keying), QPSK (Quadrature Phase Shift Keying), 16QAM (Quadrature Amplitude Modulation) or 64QAM to the coded data S202. A modulated data signal S203 supplied from the digital modulator 202 is fed into the serial-parallel converter 203. The serial-parallel converter 203 allocates the modulated data signal S203 to a subcarrier (data subcarrier).

A modulated data S204 allocated to the data subcarrier is fed into the pilot signal inserting unit 204. The pilot signal inserting unit 204 inserts a known signal called a pilot signal. The pilot signal is transmitted by a subcarrier (pilot subcarrier) which is located between the data subcarrier. In other words, the pilot signal inserting unit 204 allocates the pilot signal to the pilot subcarrier. In order to distinguish the pilot signal from a pilot signal in an OFDM signal received by an OFDM receiver, the pilot signal transmitted from the OFDM transmitter is referred to as transmission pilot signal.

A signal (the pilot signal allocated to the pilot subcarrier and the data signal allocated to the data subcarrier) S205 supplied from the pilot signal inserting unit 204 is fed into the preamble signal adding unit 205. The preamble signal adding unit 205 adds a known channel estimating signal called a channel estimating preamble to the signal S205.

A signal S206 supplied from the preamble signal adding unit 205 is fed into the inverse fast Fourier transform (IFFT) unit 206. The IFFT unit 206 performs inverse fast Fourier transform of the signal S206 to convert the signal S206 into an OFDM signal S207 on a temporal axis. The OFDM signal S207 is fed into the wireless transmission unit 207. The wireless transmission unit 207 converts the OFDM signal S207 into an analog signal, and the wireless transmission unit 207 performs frequency conversion to a signal having a radio-frequency band to produce a transmission OFDM signal. The transmission OFDM signal is transmitted through the transmitting antenna 102.

Figure 3:
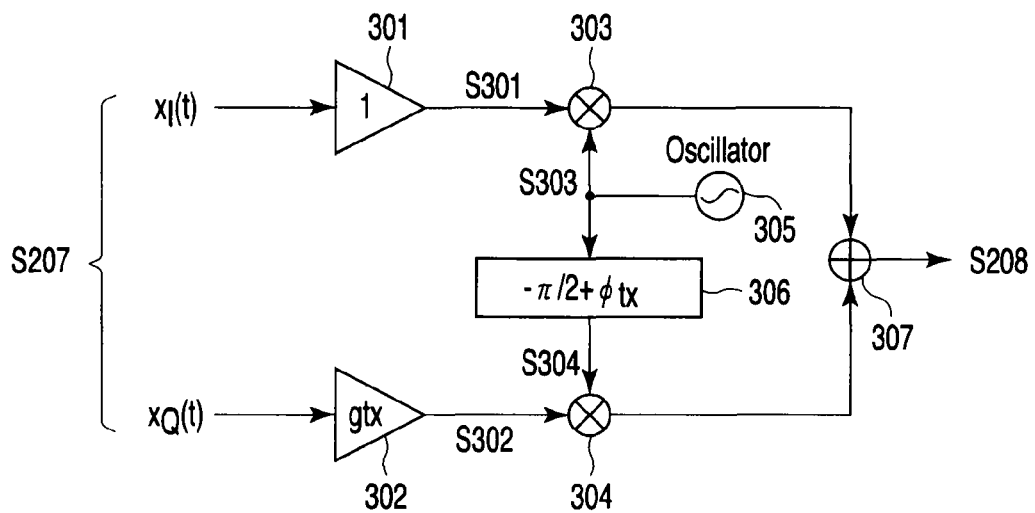
FIG. 3 shows a schematic configuration of a wireless transmission unit.

Referring to FIG. 3, in a configuration of the wireless transmission unit 207, an in-phase component and an orthogonal component of the signal S207 supplied from the IFFT unit 206 are supplied to multipliers 303 and 304 constituting the quadrature modulator through output units 301 and 302. The output units 301 and 302 are formed by a digital-analog converter or a filter. Ideally the multipliers 303 and 304 multiply the in-phase component signal S301 and the orthogonal component signal S302 by two local signals S303 and S304 having a phase difference of $-\pi/2$ respectively. An oscillator 305 produces the local signal S303. A phase shifter 306 shifts a phase of the local signal S303 by $-\pi/2$ to produce the local signal S304. An adder 307 adds signals supplied from the multipliers 303 and 304 and transmits the signal through the transmitting antenna 102.

In the case where the wireless transmission unit 207 of FIG. 3 is formed by an analog circuit, it is difficult to correctly set the phase difference between the local signals S303 and S304 to $-\pi/2$. Practically the phase shifter 306 of FIG. 3 generates a phase error $\phi_{tx}$ in the phase difference. The same holds true for amplitudes of the local signals S303 and S304. That is, an amplitude error $g_{tx}$ is generated between the local signals S303 and S304 due to a characteristic difference between the output units 301 and 302. The phase error and the amplitude error are collectively referred to as IQ imbalance. Hereinafter the IQ imbalance generated in the wireless transmission unit 207 is referred to as transmission IQ imbalance.

A frame configuration of the transmission OFDM signal produced by the OFDM transmitter 101, particularly a configuration of the transmission pilot signal will be described in detail with reference to FIG. 4.

The OFDM transmitter 101 transmits a channel estimating preamble signal $z_{tx}(k)$ before transmitting a data signal. The letter $z_{tx}(k)$ designates a channel estimating preamble signal value allocated to a k-th subcarrier. The OFDM transmitter 101 simultaneously transmits a data signal $d_{tx}(k,n)$ and a transmission pilot signal $p_{tx}(k,n)$ after transmitting the channel estimating preamble signal. The $d_{tx}(k,n)$ and $p_{tx}(k,n)$ designate a data signal value and a transmission pilot signal value which are transmitted at an n-th symbol of the k-th subcarrier respectively. The channel estimating preamble signal $Z_{tx}(k)$ and the transmission pilot signal $p_{tx}(k,n)$ are known signals in the OFDM receiver 103.

The pilot signals are transmitted using a subcarrier pair which is symmetrically located in relation to a 0-th subcarrier which is a center frequency. That is, assuming that $S_p$ is a set of subcarrier numbers with which the pilot signals are transmitted, $-k \in S_p$ holds in the case of $+k \in S_p$. Furthermore, the pilot signals are transmitted using at least two subcarrier pairs which are symmetrically located in relation to the 0-th subcarrier. In FIG. 4, the pilot signals are transmitted by $\pm k_1$-th subcarriers which are a first subcarrier pair and $\pm k_2$-th subcarriers which are a second subcarrier pair.

In the following description, for the purpose of simple explanation, it is assumed that $S_p^+$ is a set in which only positive numbers are collected in the subcarrier numbers with which the pilot signals are transmitted (that is, $S_p^+ = \{+k_1, +k_2\}$). Similarly it is assumed that $S_d^+$ is a set in which only positive numbers are collected in the subcarrier numbers with which the data signals are transmitted. It is also assumed that $S_z^+$ is a set in which only positive numbers are collected in the subcarrier numbers with which the channel estimating preamble signals are transmitted.

At this point, transmission pilot signals $\{p_{tx}(+k,n_1), p_{tx}(-k,n_1)\}$ and transmission pilot signals $\{p_{tx}(+k,n_2), p_{tx}(-k,n_2)\}$ satisfy a condition of an equation (1):

$$p_{tx}(+k,n_1)\{p_{tx}(-k,n_2)\}^* - p_{tx}(+k,n_2)\{p_{tx}(-k,n_1)\}^* \neq 0 \quad (k \in S_p^+) \tag{1}$$

where the transmission pilot signals $\{p_{tx}(+k,n_1), p_{tx}(-k,n_1)\}$ are allocated to the $\pm k$-th subcarrier pair ($k \in S_p^+$) and transmitted at $n_1$-th symbol, the transmission pilot signals $\{p_{tx}(+k,n_2), p_{tx}(-k,n_2)\}$ are allocated to the $\pm k$-th subcarrier pair ($k \in S_p^+$) and transmitted at $n_2$-th symbol, and $\{\ \}^*$ designates complex conjugate computation.

Desirably the transmission pilot signals $\{p_{tx}(+k,n_1), p_{tx}(-k,n_1)\}$ and the transmission pilot signals $\{p_{tx}(+k,n_2), p_{tx}(-k,n_2)\}$ satisfy a condition of an equation (2):

$$p_{tx}(+k,n_1) p_{tx}(+k,n_2) + \{p_{tx}(-k,n_1)\}^* \{p_{tx}(-k,n_2)\}^* = 0 \quad (k \in S_p^+) \tag{2}$$

When the transmission pilot signals satisfy the condition of the equation (2), advantageously IQ imbalance estimating accuracy is improved in a noise environment, and therefore IQ imbalance compensating accuracy is improved.

The use of at least the two subcarrier pairs located symmetrically in relation to the 0-th subcarrier can transmit the pilot signals with arbitrary subcarrier numbers. For example, the pilot signals can be transmitted using the subcarriers such as $S_p = \{\pm 7, 21\} (S_p^+ = \{+7, +21\})$ and $S_p = \{\pm 4, \pm 12, \pm 20\} (S_p^+ = \{+4, +12, +20\})$. The pilot signals can also be transmitted using arbitrary two symbols ($n_1$-th symbol and $n_2$-th symbol) such as the first symbol and second symbol or the channel estimating preamble and fourth symbol.

For the purpose of simple explanation, data signals transmitted at an n-th symbol in $\pm k$-th subcarriers ($k \in S_d^+$) are expressed by a vector $D_{tx}(k)$ of an equation (3):

$$D_{tx}(k) = \begin{bmatrix} d_{tx}(+k, n) \\ \{d_{tx}(-k, n)\}^* \end{bmatrix} \quad (k \in S_d^+) \tag{3}$$

The data signal value transmitted at an n-th symbol in an $-k$-th subcarrier is $d_{tx}(-k,n)$. However, for the purpose of convenience, the vector $D_{tx}(k)$ is defined using the complex conjugate value $\{d_{tx}(-k,n)\}^*$ in the equation (3). Pilot signals transmitted at an $n_1$-th symbol and an $n_2$-th symbol in $\pm k$-th subcarriers ($k \in S_p$) are expressed by a matrix $P_{tx}(k)$ of an equation (4):

$$P_{tx}(k) = \begin{bmatrix} p_{tx}(+k, n_1) & p_{tx}(+k, n_2) \\ \{p_{tx}(-k, n_1)\}^* & \{p_{tx}(-k, n_2)\}^* \end{bmatrix} \quad (k \in S_p^+) \tag{4}$$

The data signal values transmitted at $n_1$-th and $n_2$-th symbols in a $-k$-th subcarrier are $p_{tx}(-k,n_1)$ and $p_{tx}(-k,n_1)$ respectively. However, for the purpose of convenience, the matrix $P_{tx}(k)$ is defined using the complex conjugate values $\{p_{tx}(-k, n_1)\}^*$ and $\{p_{tx}(-k,n_1)\}^*$ in the equation (4). Transmission path estimating preamble signals transmitted in $\pm k$-th subcarriers ($k \in S_z^+$) are expressed by a vector $Z_{tx}(k)$ of an equation (5):

$$Z_{tx}(k) = \begin{bmatrix} z_{tx}(+k) \\ \{z_{tx}(-k)\}^* \end{bmatrix} \quad (k \in S_z^+) \tag{5}$$

The transmission path estimating preamble signal value transmitted at an n-th symbol in a $-k$-th subcarrier is $z_{tx}(-k)$. However, for the purpose of convenience, the vector $Z_{tx}(k)$ is defined using the complex conjugate value $\{z_{tx}(-k)\}^*$ in the equation (5).

(OFDM Receiver)

The OFDM receiver 103 in FIG. 1 will be described below with reference to FIG. 5. The OFDM receiver 103 includes a wireless reception unit 501 having a quadrature demodulator, an FFT (Fast Fourier Transform) unit 502, a reception IQ imbalance compensation unit 503, a transfer characteristic estimating unit 504, a transmission IQ imbalance removing unit 505, a reception IQ imbalance estimating unit 506, a channel estimating unit 507, a channel equalizing unit 508, and a decoder 509.

The wireless reception unit 501 performs frequency conversion of an OFDM signal S501 received through the receiving antenna 104 into a baseband signal, and converts the baseband signal into a digital signal S502.

Figure 6:
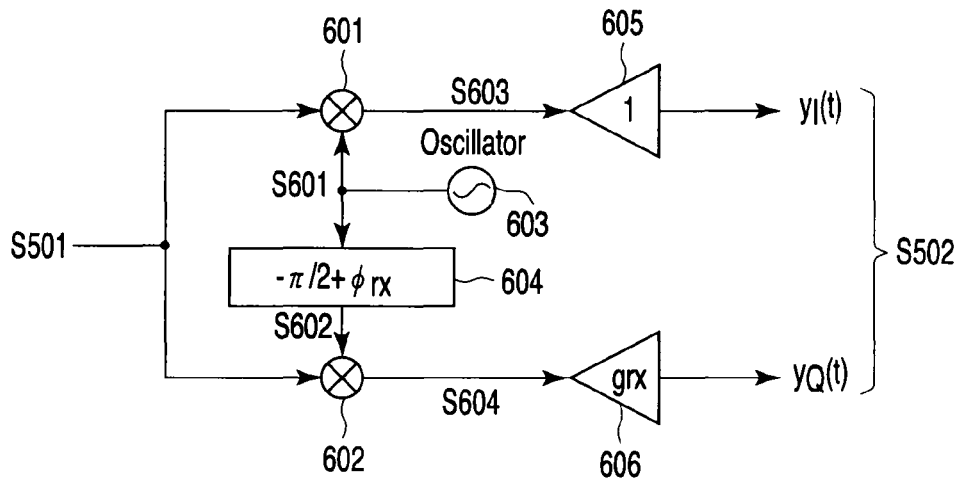
FIG. 6 shows a schematic configuration of a wireless reception unit.

FIG. 6 shows a schematic configuration of the wireless reception unit 501. Referring to FIG. 6, ideally multipliers 601 and 602 constituting the quadrature demodulator multiply the reception signal S501 by two local signals S601 and S602 having the phase difference of $-\pi/2$ in order to separate the in-phase component signal and the orthogonal component signal.

An oscillator 603 produces the local signal S601. A phase shifter 604 shifts a phase of the local signal S601 by $-\pi/2$ to produce the local signal S602.

Signals supplied from the multipliers 601 and 602 are supplied through output units 605 and 606. The output units 605 and 606 are formed by a filter or a variable gain amplifier and an analog-digital converter. Signals supplied from the output units 605 and 606 correspond to the digital signal S502 supplied from the wireless reception unit 501.

In the case where the wireless reception unit 501 of FIG. 6 is formed by an analog circuit, similarly to the wireless transmission unit 207, it is difficult to correctly set the phase difference between the local signals S601 and S602 to $-\pi/2$. Practically the phase shifter 604 of FIG. 6 generates a phase error $\phi_{rx}$ in the phase difference. The same holds true for amplitudes of the local signals S601 and S602. That is, an amplitude error $g_{rx}$ is generated between the local signals S601 and S602 due to a characteristic difference between the output units 605 and 606 or the analog-digital converter. Hereinafter the IQ imbalance generated in the wireless reception unit 501 is referred to as reception IQ imbalance, and the reception IQ imbalance is distinguished from the transmission IQ imbalance generated in the wireless transmission unit 207.

The digital signal S502 supplied from the wireless reception unit 501 is fed into the FFT unit 502, which performs fast Fourier transform of the digital signal S502 to divide the digital signal S502 into signals S503 in each subcarrier. In the signals S503 in each subcarrier, it is assumed that $d_{rx}(k,n)$ is a reception signal (reception data signal) corresponding to the transmission data signal $d_{tx}(k,n)$. It is assumed that $p_{rx}(k,n)$ is a reception signal (reception pilot signal) corresponding to the transmission pilot signal $p_{tx}(k,n)$. It is assumed that $z_{rx}(k)$ is a reception signal (reception channel estimating preamble signal) corresponding to the transmission channel estimating preamble signal $z_{tx}(k)$.

For the purpose of simple explanation, data signals received at an n-th symbol in ±k-th subcarriers ($k \in S_d^+$) are expressed by a vector $D_{rx}(k)$ of an equation (6):

$$D_{rx}(k) = \begin{bmatrix} d_{rx}(+k, n) \\ \{d_{rx}(-k, n)\}^* \end{bmatrix} (k \in S_d^+) \quad (6)$$

Pilot signals received at an $n_1$-th symbol and an $n_2$-th symbol in ±k-th subcarriers ($k \in S_p$) are expressed by a matrix $P_{rx}(k)$ of an equation (7):

$$P_{rx}(k) = \begin{bmatrix} p_{rx}(+k, n_1) & p_{rx}(+k, n_2) \\ \{p_{rx}(-k, n_1)\}^* & \{p_{rx}(-k, n_2)\}^* \end{bmatrix} (k \in S_p^+) \quad (7)$$

Channel estimating preamble signals received in ±k-th subcarriers ($k \in S_Z^+$) are expressed by a vector $Z_{rx}(k)$ of an equation (8):

$$Z_{rx}(k) = \begin{bmatrix} z_{rx}(+k) \\ \{z_{rx}(-k)\}^* \end{bmatrix} (k \in S_z^+) \quad (8)$$

For the purpose of simple explanation, it is assumed that a channel response temporal fluctuation in a frame, temporal fluctuations of the transmission IQ imbalance and reception IQ imbalance, and a thermal noise are not generated.

In the case where the transmission IQ imbalance and the reception IQ imbalance are generated in the wireless transmission unit 207 and the wireless reception unit 501, the reception signals $D_{rx}(k)$, $P_{rx}(k)$, and $Z_{rx}(k)$ are expressed by equations (9), (10), and (11):

$$D_{rx}(k) = Q_{rx}H(k)Q_{tx}D_{tx}(k) = C(k)D_{tx}(k) \ (k \in S_d^+) \quad (9)$$

$$P_{rx}(k) = Q_{rx}H(k)Q_{tx}P_{tx}(k) = C(k)P_{tx}(k) \ (k \in S_p^+) \quad (10)$$

$$Z_{rx}(k) = Q_{rx}H(k)Q_{tx}Z_{tx}(k) = C(k)Z_{tx}(k) \ (k \in S_z^+) \quad (11)$$

At this point, $Q_{tx}$ is a matrix indicating an influence of the transmission IQ imbalance generated in the wireless transmission unit 207, and $Q_{tx}$ can be expressed by an equation (12) using the amplitude error $g_{tx}$ and phase error $\phi_{tx}$ of the wireless transmission unit 207. Hereinafter $Q_{tx}$ is referred to as transmission IQ imbalance matrix:

$$Q_{tx} = \begin{bmatrix} \alpha_{tx} & \beta_{tx} \\ \beta_{tx}^* & \alpha_{tx}^* \end{bmatrix} \begin{pmatrix} \alpha_{tx} = \frac{1}{2}\{1 + g_{tx}\exp(j\phi_{tx})\} \\ \beta_{tx} = \frac{1}{2}\{1 - g_{tx}\exp(j\phi_{tx})\} \end{pmatrix} \quad (12)$$

Where j is an imaginary number unit. $Q_{rx}$ is a matrix indicating an influence of the reception IQ imbalance generated in the wireless reception unit 501, and $Q_{rx}$ can be expressed by an equation (13) using the amplitude error $g_{rx}$ and phase error $\phi_{rx}$ of the wireless reception unit 501. Hereinafter $Q_{rx}$ is referred to as reception IQ imbalance matrix.

$$Q_{rx} = \begin{bmatrix} \alpha_{rx} & \beta_{rx} \\ \beta_{rx}^* & \alpha_{rx}^* \end{bmatrix} \begin{pmatrix} \alpha_{rx} = \frac{1}{2}\{1 + g_{rx}\exp(-j\phi_{rx})\} \\ \beta_{rx} = \frac{1}{2}\{1 - g_{rx}\exp(j\phi_{rx})\} \end{pmatrix} \quad (13)$$

H(k) is a matrix indicating channel characteristics in ±k-th subcarriers, and H(k) can be expressed by an equation (14) using a channel characteristic h(k) of the k-th subcarrier and a channel characteristic h(−k) of the −k-th subcarrier. Hereinafter H(k) is referred to as channel matrix:

$$H(k) = \begin{bmatrix} h(k) & 0 \\ 0 & \{h(-k)\}^* \end{bmatrix} \quad (14)$$

It can be thought that H(k) has not only the channel characteristics in the ±k-th subcarriers but also frequency characteristics of the wireless transmission unit 207 and wireless reception unit 501. In the equations (9) to (11), C(k) is a transfer characteristic in which the transmission IQ imbalance $Q_{tx}$, the channel characteristic H(k) in the ±k-th subcarriers, and the reception IQ imbalance $Q_{rx}$ are combined, and C(k) can be expressed by an equation (15). Hereinafter C(k) is referred to as transfer characteristic matrix:

$$C(k) = Q_{rx}H(k)Q_{tx} \quad (15)$$

In the equation (14), off-diagonal elements in the channel characteristic matrix H(k) have a value of "0". This means that a signal transmitted in a k-th subcarrier and a signal transmitted in a −k-th subcarrier do not interfere with each other in an influence of an individual channel.

On the other hand, in the equation (12), the off-diagonal elements in the transmission IQ imbalance matrix $Q_{tx}$ have values of $\beta_{tx}$ and $\beta_{tx}^*$. This means that a signal transmitted in a k-th subcarrier and a signal transmitted in a −k-th subcarrier interfere with each other due to the influence of the transmission IQ imbalance generated in the wireless transmission unit 207.

Similarly, in the equation (13), the off-diagonal elements in the reception IQ imbalance matrix $Q_{rx}$ have values of $\beta_{rx}$ and $\beta_{rx}^*$. This means that a signal transmitted in a k-th subcarrier and a signal transmitted in a −k-th subcarrier interfere with each other due to the influence of the reception IQ imbalance generated in the wireless reception unit 501.

Unfortunately the inter-subcarrier interference, caused by the IQ imbalance and located on a frequency axis in symmetrical relation to the center frequency, deteriorates reception quality.

In the first embodiment, the inter-subcarrier interference caused by the reception IQ imbalance is removed in the below-mentioned way to improve the reception quality.

In the signal S503 supplied from the FFT unit 502, a signal corresponding to the reception channel estimating preamble signal $Z_{rx}(k)$ and a signal corresponding to the reception data signal $D_{rx}(k)$ are fed into the reception IQ imbalance compensation unit 503. In the signal S503 supplied from the FFT unit 502, a signal corresponding to the reception pilot signal $P_{rx}(k)$ is fed into the transfer characteristic estimating unit 504.

The transfer characteristic estimating unit 504 estimates the transfer characteristic C(k) from the reception pilot signal $P_{rx}(k)$ for the two subcarrier pairs of the subcarrier numbers ±$k_1$ and ±$k_2$. The transmission IQ imbalance, the channel characteristic, and the reception IQ imbalance are combined in the transfer characteristic C(k). Information S504 on the transfer characteristic estimated by the transfer characteristic estimating unit 504 is fed into the transmission IQ imbalance removing unit 505.

Using the transfer characteristic matrix estimate values concerning the two subcarrier pairs of the subcarrier numbers ±$k_1$ and ±$k_2$, the transmission IQ imbalance removing unit 505 produces a transfer characteristic in which the influence of the transmission IQ imbalance is removed. The transmission IQ imbalance removing unit 505 supplies a signal S505 indicating the transfer characteristic to the reception IQ imbalance estimating unit 506.

The reception IQ imbalance estimating unit 506 estimates a reception IQ imbalance characteristic from the transfer characteristic, and supplies a signal S506 indicating the reception IQ imbalance characteristic to the reception IQ imbalance compensation unit 503.

The reception IQ imbalance compensation unit 503 performs processing for compensating the influence of the reception IQ imbalance to the channel estimating preamble signal $Z_{rx}(k)$ and data signal $D_{rx}(k)$ fed from the FFT unit 502 according to the computed reception IQ imbalance characteristic. A channel estimating preamble signal S507 and a data signal S508, in which the influence of the reception IQ imbalance is compensated, are fed into the channel estimating unit 507 and the channel equalizing unit 508 respectively.

The channel estimating unit 507 estimates a channel characteristic using the channel estimating preamble signal S507, and supplies a signal S509 indicating the estimated channel characteristic to the channel equalizing unit 508.

The channel equalizing unit 508 performs equalization to the data signal S508 in order to remove a channel distortion according to the estimated channel characteristic, and then supplies a data signal S510. The estimate and equalization of the channel characteristic can be performed by well-known techniques.

The decoder 509 decodes the data signal S510 in which the channel distortion is equalized, and supplies reproduction data S511 of the transmission data.

The transfer characteristic estimating unit 504, the transmission IQ imbalance removing unit 505, the reception IQ imbalance estimating unit 506, and the reception IQ imbalance compensation unit 503 will be described in detail.

The transfer characteristic estimating unit 504 estimates the transfer characteristic matrix C(k) for the two subcarrier pairs of the subcarrier numbers ±$k_1$ and ±$k_2$. The transmission IQ imbalance, the channel characteristic, and the reception IQ imbalance are combined in the transfer characteristic matrix C(k). Assuming that C'(k) is an estimate value of the transfer characteristic matrix C(k) concerning the ±k-th subcarrier pair, the transfer characteristic estimating unit 504 computes the transfer characteristic matrix C'(k) from an equation (16) using the reception pilot signal $P_{rx}(k)$ and the known transmission pilot signal $P_{tx}(k)$:

$$C'(k) = P_{rx}(k)\{P_{tx}(k)\}^{-1} \quad (k \in S_p^+) \quad (16)$$

Where $\{\ \}^{-1}$ expresses inverse matrix computation. The equation (10) holds in the case where the channel response temporal fluctuation in the frame, the temporal fluctuations of the transmission IQ imbalance and reception IQ imbalance, and the thermal noise are ignored. Accordingly, the equation (16) can be expanded as follows, and it can be seen that the transfer characteristic matrix C(k) is correctly estimated:

$$\begin{aligned} C'(k) &= P_{rx}(k)\{P_{tx}(k)\}^{-1} \\ &= \{C(k)P_{tx}(k)\}\{P_{tx}(k)\}^{-1} \\ &= C(k)(k \in S_p^+) \end{aligned} \quad (17)$$

Because the transmission pilot signal $P_{tx}(k)$ satisfies the equation (1), the inverse matrix $\{P_{tx}(k)\}^{-1}$ can be computed. As a result, the transfer characteristic matrix C'(k) can be computed by the equation (16). When the transmission pilot signal $P_{tx}(k)$ further satisfies the equation (2), transfer characteristic matrix estimating accuracy under a thermal noise environment is improved compared with the case in which the equation (2) is not satisfied. The transfer characteristic estimating unit 504 supplies the signal S504 to the transmission IQ imbalance removing unit 505. The signal S504 indicates the transfer characteristic matrix C'($k_1$) for the first subcarrier pair and the transfer characteristic matrix C'($k_2$) for the second subcarrier pair, and the transfer characteristic matrix C'($k_1$) and the transfer characteristic matrix C'($k_2$) are computed from the equation (16).

The transmission IQ imbalance removing unit 505 produces the transfer characteristic in which the influence of the transmission IQ imbalance is removed using the transfer characteristic matrix estimate values C'($k_1$) and C'($k_2$) concerning the subcarrier numbers ±$k_1$ and ±$k_2$. The estimate values C'($k_1$) and C'($k_2$) concerning the subcarrier numbers ±$k_1$ and ±$k_2$ are fed from the transfer characteristic estimating unit 504. It is assumed that a matrix A is the transfer characteristic in which the influence of the transmission IQ imbalance is removed.

The transmission IQ imbalance removing unit 505 computes the matrix A from an equation (18) using the transfer characteristic matrix estimate values C'($k_1$) and C'($k_2$) concerning the two subcarrier pairs of the subcarrier numbers ±$k_1$ and ±$k_2$:

$$A = C'(k_1)\{C'(k_2)\}^{-1} \quad (18)$$

Because the equation (17) holds in the case where the channel response temporal fluctuation in the frame, the temporal fluctuations of the transmission IQ imbalance and reception IQ imbalance, and the thermal noise are ignored, the equation (18) can be expanded into an equation (19). As can be seen from the equation (19), the influence of the transmission IQ imbalance (term of $Q_{tx}$) is removed:

$$\begin{aligned} A &= C'(k_1)\{C'(k_2)\}^{-1} \\ &= C(k_1)\{C(k_2)\}^{-1} \\ &= Q_{rx}H(k_1)Q_{tx}\{Q_{rx}H(k_2)Q_{tx}\}^{-1} \quad (\because \text{equation}(15)) \\ &= Q_{rx}H(k_1)Q_{tx}Q_{tx}^{-1}\{H(k_2)\}^{-1}Q_{rx}^{-1} \\ &= Q_{rx}H(k_1)\{H(k_2)\}^{-1}Q_{rx}^{-1} \\ &= Q_{rx}D_A Q_{rx}^{-1} \end{aligned} \quad (19)$$

where $D_A$ is a diagonal matrix given by the following equation.

$$D_A = H(k_1)\{H(k_2)\}^{-1} \\ = \begin{bmatrix} \lambda_1 & 0 \\ 0 & \lambda_2 \end{bmatrix} \begin{pmatrix} \lambda_1 = h(k_1)/h(k_2) \\ \lambda_2 = \{h(-k_1)\}^*/\{h(-k_2)\}^* \end{pmatrix} \quad (20)$$

The transmission IQ imbalance removing unit 505 supplies the signal S505 to the reception IQ imbalance estimating unit 506. The signal S505 indicates the transfer characteristic matrix A computed from the equation (18).

A principal property of the transfer characteristic matrix A computed from the equation (18) will be described below. For the purpose of convenience, the reception IQ imbalance matrix $Q_{rx}$ defined by the equation (13) is expressed in terms of vectors $E_1$ and $E_2$ as follows:

$$Q_{rx} = [E_1 \ E_2 ] \left( E_1 = \begin{bmatrix} \alpha_{rx} \\ \beta_{rx}^* \end{bmatrix}, E_2 = \begin{bmatrix} \beta_{rx} \\ \alpha_{rx}^* \end{bmatrix} \right) \quad (21)$$

As described above, the transfer characteristic matrix A computed from the equation (18) can be expressed by the equation (19) in the case where the channel response temporal fluctuation in the frame, the temporal fluctuations of the transmission IQ imbalance and reception IQ imbalance, and the thermal noise are ignored. The equation (19) can be deformed into an equation (22) using the equations (20) and (21):

$$A = Q_{rx} D Q_{rx}^{-1} \quad (22)$$
$$A Q_{rx} = Q_{rx} D$$
$$A[E_1 \ E_2] = [E_1 \ E_2] \begin{bmatrix} \lambda_1 & 0 \\ 0 & \lambda_2 \end{bmatrix}$$
$$[AE_1 \ AE_2] = [\lambda_1 E_1 \ \lambda_2 E_2]$$

An equation (23) is obtained from the equation (22).

$$AE_i = \lambda_i E_i \ (i=1,2) \quad (23)$$

In the equation (23), $\lambda_i$ is an eigenvalue of the matrix A and Ei is an eigenvector of the matrix A corresponding to the eigenvalue $\lambda_i$. That is, the two eigenvectors obtained from the transfer characteristic matrix A are equal to the vectors $E_1$ and $E_2$ constituting the reception IQ imbalance matrix $Q_{rx}$.

The reception IQ imbalance estimating unit 506 estimates the reception IQ imbalance matrix $Q_{rx}$ by utilizing the property of the transfer characteristic matrix A. Specifically, the two eigenvectors concerning the transfer characteristic matrix A are computed to compute the reception IQ imbalance matrix $Q_{rx}$.

The reception IQ imbalance estimating unit 506 computes the two eigenvectors concerning the transfer characteristic matrix A using the transfer characteristic matrix A supplied from the transmission IQ imbalance removing unit 505. Because the eigenvector can be obtained from the matrix by a well-known technique, the description is omitted. In the following description, the two eigenvectors computed from the transfer characteristic matrix A are expressed as follows:

$$V_1 = [v_1(1) \ v_1(2)]^T$$
$$V_2 = [v_2(1) \ v_2(2)]^T$$

where T is transpose computation.

Then, the reception IQ imbalance estimating unit 506 estimates the reception IQ imbalance matrix $Q_{rx}$ from the two eigenvectors $V_1$ and $V_2$. Assuming that the phase error $\phi_{rx}$ of the reception IQ imbalance falls within a range of $-\pi/2 < \phi_{rx} < \pi/2$, a relational expression of $|\alpha_{rx}| > |\beta_{rx}|$ holds in the reception IQ imbalance matrix $Q_{rx}$ shown in the equation (13).

Therefore, the reception IQ imbalance estimating unit 506 computes the reception IQ imbalance matrix estimate value $Q'_{rx}$ when the condition of $|v_1(1)| > |v_1(2)|$ is satisfied for the eigenvector $V_1$ (or when the condition of $|v_2(2)| > |v_2(1)|$ is satisfied for the eigenvector $V_2$):

$$Q'_{rx} = [V_1 V_2] (|v_1(1)| > |v_1(2)| \text{ or } |v_2(2)| > |v_2(1)|) \quad (24)$$

On the other hand, the reception IQ imbalance estimating unit 506 computes the reception IQ imbalance matrix estimate value $Q'_{rx}$ when the condition of $|v_1(2)| \geq |v_1(1)|$ is satisfied for the eigenvector $V_1$ (or when the condition of $|v_2(1)| \geq |v_2(2)|$ is satisfied for the eigenvector $V_2$):

$$Q'_{rx} = [V_2 V_1] (|v_1(2)| \geq |v_1(2)| \text{ or } |v_2(1)| \geq |v_2(2)|) \quad (25)$$

The reception IQ imbalance estimating unit 506 supplies the signal S506 to the reception IQ imbalance compensation unit 503. The signal S506 indicates the reception IQ imbalance matrix estimate value $Q'_{rx}$ computed from the equation (24) or (25).

Using the reception IQ imbalance matrix estimate value $Q'_{rx}$ supplied from the reception IQ imbalance estimating unit 506, the reception IQ imbalance compensation unit 503 performs the compensation to the reception data signal $D_{rx}(k)$ and the reception channel estimating preamble signal $Z_{rx}(k)$ in order to remove the influence of the reception IQ imbalance.

More specifically, the reception IQ imbalance compensation unit 503 removes the reception IQ imbalance matrix $Q_{rx}$ of the equations (9) and (11) to compensate the inter-subcarrier interference caused by the reception IQ imbalance.

It is assumed that $d'_{rx}(k,n)$ is a signal in which the compensation of the reception IQ imbalance is already performed to the reception data signal $d_{rx}(k,n)$. It is assumed that $z'_{rx}(k)$ is a signal in which the compensation of the reception IQ imbalance is already performed to the reception channel estimating preamble signal $z_{rx}(k)$.

For the purpose of simple explanation, a signal in which the reception IQ imbalance compensation is already performed to a data signal received at an n-th symbol in $\pm k$-th subcarriers ($k \in S_d^+$) is expressed by a vector $D'_{rx}(k)$ of an equation (26):

$$D'_{rx}(k) = \begin{bmatrix} d'_{rx}(+k, n) \\ \{d'_{rx}(-k, n)\}^* \end{bmatrix} (k \in S_d^+) \quad (26)$$

A signal in which the reception IQ imbalance compensation is already performed to a channel estimating preamble signal received in $\pm k$-th subcarriers ($k \in S_d^+$) is expressed by a vector $Z'_{rx}(k)$ of an equation (27):

$$Z'_{rx}(k) = \begin{bmatrix} z'_{rx}(+k, n) \\ \{z'_{rx}(-k, n)\}^* \end{bmatrix} (k \in S_z^+) \quad (27)$$

At this point, through an equation (28), the reception IQ imbalance compensation unit 503 uses the reception IQ imbalance matrix estimate value $Q'_{rx}$ to perform the compensation to the reception data signal $D_{rx}(k)$ and the reception channel estimating preamble signal $Z_{rx}(k)$ in order to remove the influence of the reception IQ imbalance:

$$D'_{rx}(k) = Q'^{-1}_{rx} D_{rx}(k) \ (k \in S_d^+) \quad (28)$$

$$Z'_{rx}(k) = Q'^{-1}_{rx} Z_{rx}(k) \ (k \in S_z^+) \quad (29)$$

When the estimate of the reception IQ imbalance matrix is completely performed ($Q'_{rx} = Q_{rx}$), the equations (28) and (29)

can be expanded into equations (30) and (31), respectively, by the equations (9) and (11). It can be seen from the equations (30) and (31) that the influence of the reception IQ imbalance (term of $Q_{rx}$) is removed:

$$D'_{rx}(k) = Q'^{-1}_{rx} D_{rx}(k) \qquad (30)$$
$$= Q^{-1}_{rx} Q_{rx} H(k) Q_{tx} D_{tx}(k)$$
$$= H(k) Q_{tx} D_{tx}(k)$$

$$Z'_{rx}(k) = Q'^{-1}_{rx} Z_{rx}(k) \qquad (31)$$
$$= Q^{-1}_{rx} Q_{rx} H(k) Q_{tx} Z_{tx}(k)$$
$$= H(k) Q_{tx} Z_{tx}(k)$$

Effect of First Embodiment

Thus, in the OFDM receiver of the first embodiment, the transfer characteristics concerning the two pilot signal pairs symmetrically located in relation to the center frequency are estimated, the influence of the transmission IQ imbalance is removed using the estimated two transfer characteristic pairs, and the reception IQ imbalance characteristic is estimated. Therefore, the reception IQ imbalance characteristic can accurately be estimated without the influence of the error caused by the transmission IQ imbalance. The compensation is performed to the channel estimating preamble signal and the data signal using the estimated reception IQ imbalance characteristic, so that the influence of the reception IQ imbalance can effectively be removed to accurately perform the channel estimate processing and data signal demodulation.

Because the OFDM receiver of the first embodiment estimates the reception IQ imbalance characteristic of itself, it is not necessary to perform the estimate processing in each frame unlike the conventional technique. That is, the reception IQ imbalance characteristic is estimated only one time using the reception frame including the pilot signal, and the estimate value can be used in the compensation processing when another frame is received.

The reception IQ imbalance characteristics are estimated in the plural frames to average out the reception IQ imbalance characteristics, so that the reception IQ imbalance estimating accuracy can be improved.

Second Embodiment

An OFDM transmitter according to a second embodiment of the invention has the same configuration as the first embodiment of FIG. 2. In the second embodiment, the transmission pilot signal satisfies not only the equation (1) and desirably the equation (1) and (2), but also the following equation (32):

$$P_{tx}(k_1) = \mu P_{tx}(k_2) \text{ ($\mu$ is an arbitrary complex coefficient)} \qquad (32)$$

The following equations (33), (34), (35), and (36) can be cited as an example of a combination of the transmission pilot signals, that is, a combination of $p_{tx}(+k_1,n_1)$, $p_{tx}(-k_1,n_1)$, $p_{tx}(+k_1,n_2)$, $p_{tx}(-k_1,n_2)$, $p_{tx}(+k_2,n_1)$, $p_{tx}(-k_2,n_1)$, $p_{tx}(+k_2,n_2)$, and $p_{tx}(-k_2,n_2)$ satisfying the three conditions shown in the equations (1), (2), and (32):

$$\left.\begin{array}{l} p_{tx}(+k_1, n_1) = +1 \\ p_{tx}(-k_1, n_1) = +1 \\ p_{tx}(+k_1, n_2) = -1 \\ p_{tx}(-k_1, n_2) = +1 \\ p_{tx}(+k_2, n_1) = -1 \\ p_{tx}(-k_2, n_1) = -1 \\ p_{tx}(+k_2, n_2) = +1 \\ p_{tx}(-k_2, n_2) = -1 \end{array}\right\} \qquad (33)$$

$$\left.\begin{array}{l} p_{tx}(+k_1, n_1) = +1 \\ p_{tx}(-k_1, n_1) = +1 \\ p_{tx}(+k_1, n_2) = -1 \\ p_{tx}(-k_1, n_2) = +1 \\ p_{tx}(+k_2, n_1) = +j \\ p_{tx}(-k_2, n_1) = -j \\ p_{tx}(+k_2, n_2) = -j \\ p_{tx}(-k_2, n_2) = -j \end{array}\right\} \qquad (34)$$

$$\left.\begin{array}{l} p_{tx}(+k_1, n_1) = +1 \\ p_{tx}(-k_1, n_1) = +1 \\ p_{tx}(+k_1, n_2) = -j \\ p_{tx}(-k_1, n_2) = -j \\ p_{tx}(+k_2, n_1) = -j \\ p_{tx}(-k_2, n_1) = +j \\ p_{tx}(+k_2, n_2) = -1 \\ p_{tx}(-k_2, n_2) = +1 \end{array}\right\} \qquad (35)$$

$$\left.\begin{array}{l} p_{tx}(+k_1, n_1) = (+1+j)/\sqrt{2} \\ p_{tx}(-k_1, n_1) = (+1-j)/\sqrt{2} \\ p_{tx}(+k_1, n_2) = (-1-j)/\sqrt{2} \\ p_{tx}(-k_1, n_2) = (+1-j)/\sqrt{2} \\ p_{tx}(+k_2, n_1) = (-1-j)/\sqrt{2} \\ p_{tx}(-k_2, n_1) = (-1+j)/\sqrt{2} \\ p_{tx}(+k_2, n_2) = (+1+j)/\sqrt{2} \\ p_{tx}(-k_2, n_2) = (-1+j)/\sqrt{2} \end{array}\right\} \qquad (36)$$

Figure 5:
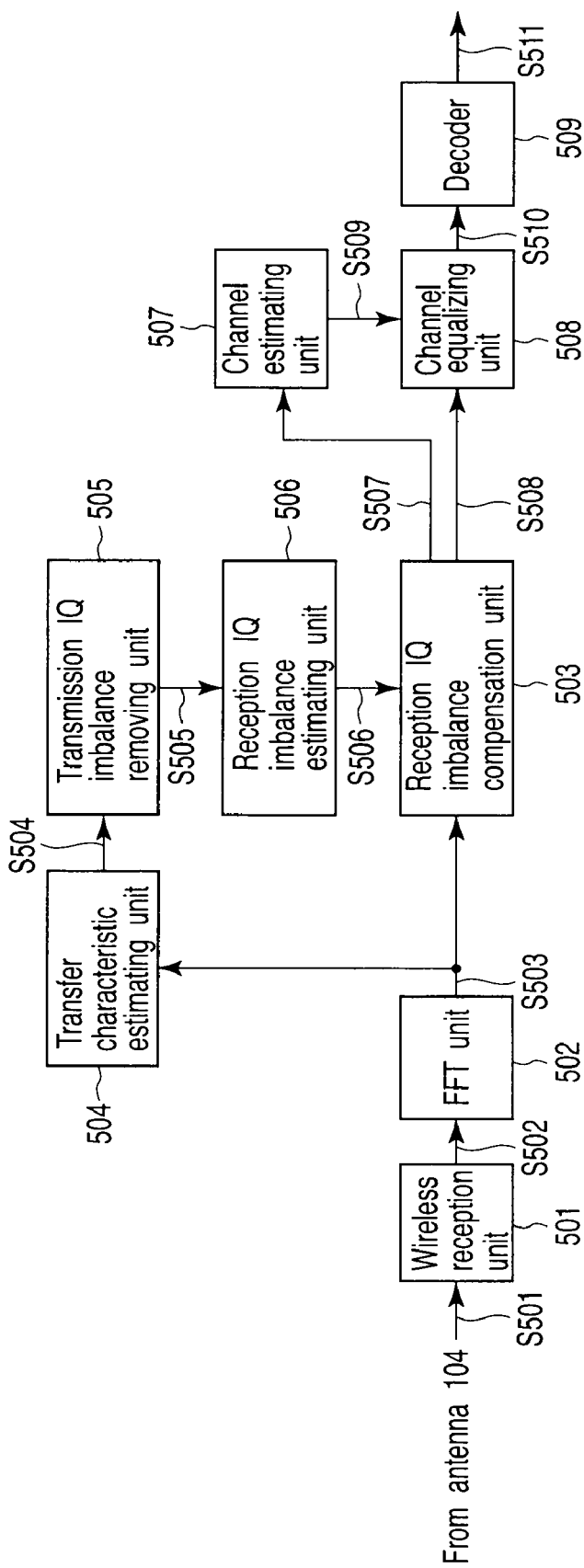
FIG. 5 shows a configuration of an FDM signal receiver of the first embodiment.

In the case where the transmission pilot signal satisfies the equation (32), the transfer characteristic A in which the influence of the transmission IQ imbalance is removed can be obtained without the use of the transfer characteristic estimating unit 504 of the first embodiment shown in FIG. 5.

FIG. 7 shows a configuration of the OFDM receiver 103 of the second embodiment. Referring to FIG. 7, the OFDM receiver 103 includes a wireless reception unit 701 having a quadrature demodulator, an FFT (Fast Fourier Transform) unit 702, a reception IQ imbalance compensation unit 703, a transmission IQ imbalance removing unit 704, a reception IQ imbalance estimating unit 705, a channel estimating unit 706, a channel equalizing unit 707, and a decoder 708.

The wireless reception unit 701 performs the frequency conversion of an OFDM signal S701 received through the receiving antenna 104 into a baseband signal, and then converts the baseband signal into a digital signal S702. The digital signal S702 supplied from the wireless reception unit 701 is fed into the FFT unit 702, which performs the fast Fourier transform to the digital signal S702 to divide the digital signal S702 into signals S703 in each subcarrier.

In the signals S703 in each subcarrier, a signal corresponding to the reception channel estimating preamble signal $Z_{rx}(k)$ and a signal corresponding to the reception data signal $D_{rx}(k)$ are fed into the reception IQ imbalance compensation unit 703. In the signal S703 supplied from the FFT unit 702, a signal corresponding to the reception pilot signal $P_{rx}(k)$ is fed into the transmission IQ imbalance removing unit 704.

The transmission IQ imbalance removing unit 704 produces the transfer characteristic, in which the influence of the transmission IQ imbalance is removed, from the reception pilot signal, and the transmission IQ imbalance removing unit 704 supplies a signal S704 indicating the transfer characteristic to the reception IQ imbalance estimating unit 705.

The reception IQ imbalance estimating unit 705 estimates the reception IQ imbalance characteristic from the transfer characteristic, and supplies a signal S705 indicating the reception IQ imbalance characteristic to the reception IQ imbalance compensation unit 703.

The reception IQ imbalance compensation unit 703 performs processing for compensating the influence of the reception IQ imbalance to the channel estimating preamble signal $Z_{rx}(k)$ and data signal $D_{rx}(k)$, fed from the FFT unit 702, according to the computed reception IQ imbalance characteristic. A channel estimating preamble signal S706 and a data signal S707, in which the influence of the reception IQ imbalance is compensated, are supplied to the channel estimating unit 706 and the channel equalizing unit 707 respectively.

The channel estimating unit 706 estimates the channel characteristic using the channel estimating preamble signal S706. A signal S708 indicating the estimated channel characteristic is fed into the channel equalizing unit 707.

The channel equalizing unit 707 performs equalization of the data signal S707 in order to remove a channel distortion according to the estimated channel characteristic, and supplies a data signal S709 in which the equalization is already performed.

The decoder 708 decodes the data signal S709 to which the equalization is already performed, and supplies reproduction data S710 of the transmission data.

The OFDM receiver of the second embodiment performs the same processing as the first embodiment except for the transmission IQ imbalance removing unit 704. The transmission IQ imbalance removing unit 704 of the second embodiment will be described below.

The transmission IQ imbalance removing unit 704 computes a transfer characteristic A in which the influence of the transmission IQ imbalance is removed from an equation (37) using the reception pilot signals $P_{rx}(k_1)$ of the subcarrier number $\pm k_1$ and the reception pilot signals $P_{rx}(k_2)$ of the subcarrier number $\pm k_2$:

$$A = P_{rx}(k_1)\{P_{rx}(k_2)\}^{-1} \quad (37)$$

In the second embodiment, because the transmission pilot signal satisfies the equation (32), the equation (37) can be expanded into an equation (38). The transfer characteristic in which an influence of the transmission IQ imbalance, that is, the term of $Q_{tx}$ is removed can be estimated from the equation (38):

$$\begin{aligned} A &= P_{rx}(k_1)\{P_{rx}(k_2)\}^{-1} \\ &= Q_{rx}H(k_1)Q_{tx}P_{tx}(k_1)\{Q_{rx}H(k_2)Q_{tx}P_{tx}(k_2)\}^{-1} \\ &\quad (\because \text{equation}(10)) \\ &= Q_{rx}H(k_1)Q_{tx}\{\mu P_{tx}(k_2)\}(P_{tx}(k_2))^{-1}Q_{tx}^{-1}\{H(k_2)\}^{-1}Q_{rx}^{-1} \\ &= Q_{rx}D'_A Q_{rx}^{-1} \end{aligned} \quad (38)$$

where $D_A$ is a diagonal matrix given by the following equation.

$$\begin{aligned} D'_A &= \mu H(k_1)\{H(k_2)\}^{-1} \\ &= \begin{bmatrix} \lambda'_1 & 0 \\ 0 & \lambda'_2 \end{bmatrix} \begin{pmatrix} \lambda'_1 = \mu h(k_1)/h(k_2) \\ \lambda'_2 = \mu\{h(-k_1)\}^*/\{h(-k_2)\}^* \end{pmatrix} \end{aligned} \quad (39)$$

The transmission IQ imbalance removing unit 704 supplies the signal S704 indicating the transfer characteristic matrix A computed by the equation (37) to the reception IQ imbalance estimating unit 705.

Effect of Second Embodiment

Thus, the transmission pilot signal of the second embodiment satisfies not only the equation (1) and desirably the equations (1) and (2) but also the equation (32). Therefore, in the OFDM receiver of the second embodiment, the transfer characteristic in which the transmission IQ imbalance is removed can directly be estimated from the reception pilot signal. Accordingly, in the OFDM receiver of the second embodiment, a receiver computation amount and a circuit scale can be reduced without the processing performed by the transfer characteristic estimating unit 504 of the first embodiment shown in FIG. 5.

Third Embodiment

An OFDM transmitter according to a third embodiment of the invention has the same configuration as the first embodiment of FIG. 2.

Figure 8:
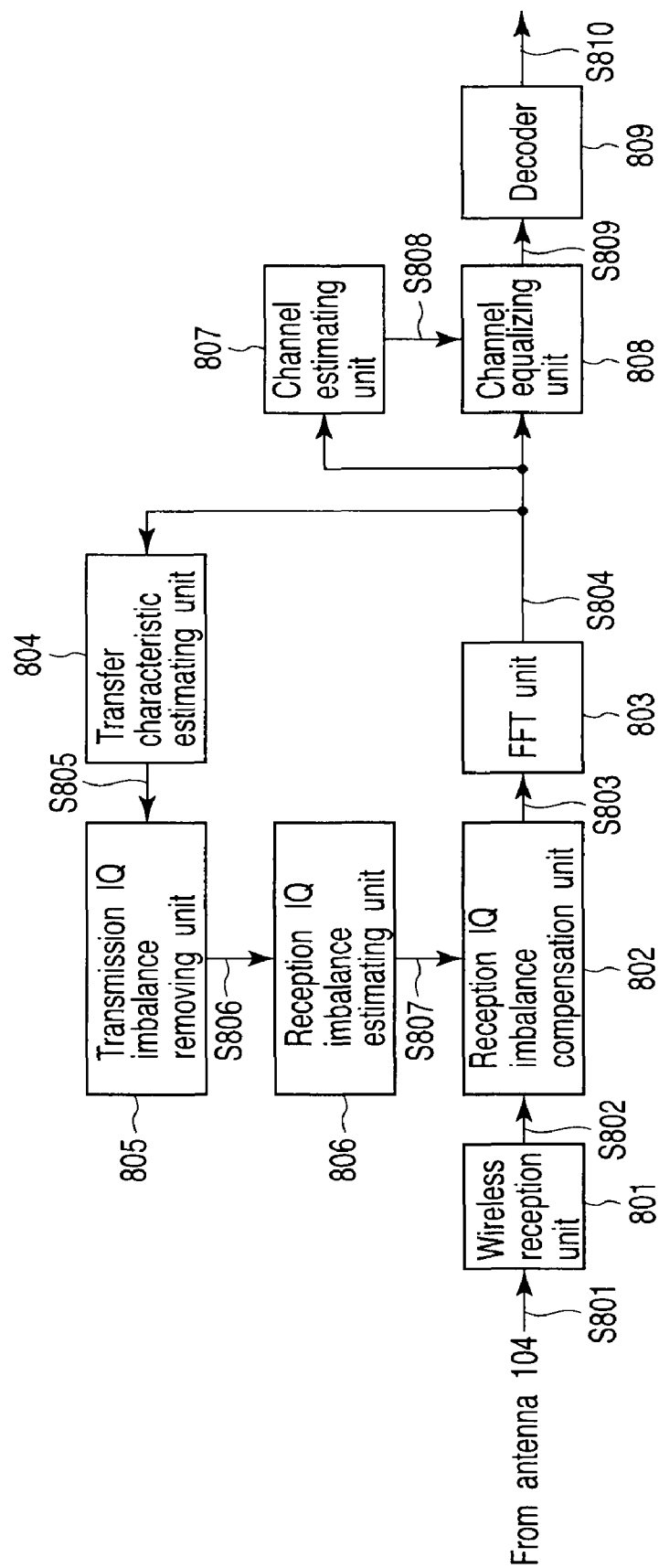
FIG. 8 shows a configuration of an OFDM signal receiver according to the third embodiment.

FIG. 8 shows a configuration of the OFDM transmitter of the third embodiment. The OFDM receiver 103 of the third embodiment will be described below with reference to FIG. 8.

The OFDM receiver 103 includes a wireless reception unit 801 having a quadrature demodulator, a reception IQ imbalance compensation unit 802, an FFT (Fast Fourier Transform) unit 803, a transfer characteristic estimating unit 804, a transmission IQ imbalance removing unit 805, a reception IQ imbalance estimating unit 806, a channel estimating unit 807, a channel equalizing unit 808, and a decoder 809.

The wireless reception unit 801 performs the frequency conversion of an OFDM signal S801 received through the receiving antenna 104 into the baseband signal, and converts the baseband signal into a digital signal S802. The digital signal S802 supplied from the wireless reception unit 801 is fed into the reception IQ imbalance compensation unit 802.

The reception IQ imbalance compensation unit 802 directly supplies the digital signal S802 sequentially fed from the wireless reception unit 801 to the FFT unit 803 until a reception IQ imbalance characteristic S807 is fed from the reception IQ imbalance estimating unit 806.

In signals S804 supplied from the FFT unit 803, a signal corresponding to the reception channel estimating preamble signal $Z_{rx}(k)$ is fed into the channel estimating unit 807. In the signals S804 supplied from the FFT unit 803, a signal corresponding to the reception data signal $D_{rx}(k)$ is fed into the channel equalizing unit 808. In the signals S804 supplied from the FFT unit 803, a signal corresponding to the reception pilot signal $P_{rx}(k)$ is fed into the transfer characteristic estimating unit 804.

Using the fed reception pilot signal $P_{rx}(k)$, the transfer characteristic estimating unit 804 estimates the transfer characteristic $C(k)$ in which the transmission IQ imbalance, the channel characteristic, and the reception IQ imbalance are combined for each of the two subcarrier pairs of the subcarrier numbers $\pm k_1$ and $\pm k_2$.

Information S805 indicating the transfer characteristic estimated by the transfer characteristic estimating unit 804 is fed into the transmission IQ imbalance removing unit 805. Using the transfer characteristic matrix estimate values concerning the two subcarrier pairs of the subcarrier numbers $\pm k_1$ and $\pm k_2$, the transmission IQ imbalance removing unit 805 produces the transfer characteristic in which the influence of the transmission IQ imbalance is removed. The transmission IQ imbalance removing unit 805 supplies a signal S806 indicating the transfer characteristic to the reception IQ imbalance estimating unit 806. The reception IQ imbalance estimating unit 806 estimates the reception IQ imbalance characteristic from the transfer characteristic, supplies a signal S807 indicating the reception IQ imbalance characteristic to the reception IQ imbalance compensation unit 802.

The reception IQ imbalance compensation unit 802 performs the processing for compensating the influence of the reception IQ imbalance to the digital signal S802 sequentially fed from the wireless reception unit 801 according to the reception IQ imbalance characteristic fed from the reception IQ imbalance estimating unit 806.

The channel estimating unit 807 estimates the channel characteristic using the channel estimating preamble signal. A signal S808 indicating the estimated channel characteristic is fed into the channel equalizing unit 808. The channel equalizing unit 808 performs the equalization of the data signal in order to remove the channel distortion according to the estimated channel characteristic, and supplies a data signal S809 in which the equalization is already performed.

The decoder 809 decodes the data signal S809 to which the equalization is already performed, and supplies reproduction data S810 of the transmission data.

It is assumed that $y(t)=y_I(t)+jy_Q(t)$ is a digital signal which is supplied at a time t from the wireless reception unit 801.

$y_I(t)$ and $y_Q(t)$ express the in-phase component signal and orthogonal component signal shown in FIG. 6 respectively. In an ideal environment in which the reception IQ imbalance is not generated, it is assumed that $y_O(t)=y_{OI}(t)+jy_{OQ}(t)$ is a digital signal which is supplied at the time t. In the wireless reception unit 801, $y_{OI}(t)$ and $y_{OQ}(t)$ express the in-phase component signal and orthogonal component signal, obtained in the ideal environment in which the reception IQ imbalance is not generated, respectively. For the purpose of simple explanation, the digital signal supplied at the time t is expressed by a vector $Y(t)$ as shown in an equation (40):

$$Y(t) = \begin{bmatrix} y(t) \\ \{y(t)\}* \end{bmatrix} \quad (40)$$

In the ideal environment in which the reception IQ imbalance is not generated, the digital signal supplied at the time t is expressed by a vector $Y_0(t)$ as shown in an equation (41):

$$Y_0(t) = \begin{bmatrix} y_0(t) \\ \{y_0(t)\}* \end{bmatrix} \quad (41)$$

In the case where the reception IQ imbalance is generated in the wireless reception unit 801, the reception signal $Y(t)$ can be expressed as shown in an equation (42) using the reception IQ imbalance matrix $Q_{rx}$ defined by the equation (13):

$$Y(t)=Q_{rx}Y_0(t) \quad (42)$$

The OFDM receiver of the third embodiment performs the same processing as FIG. 5 of the first embodiment except for the reception IQ imbalance compensation unit 802. The compensation processing performed by the reception IQ imbalance compensation unit 802 of the third embodiment will be described below.

The reception IQ imbalance compensation unit 802 performs the compensation to the digital signal $Y(t)$ in order to remove the influence of the reception IQ imbalance when the signal S807 indicating the reception IQ imbalance matrix estimate value $Q'_{rx}$ is fed from the reception IQ imbalance estimating unit 806. More specifically, the reception IQ imbalance compensation unit 802 removes the reception IQ imbalance matrix $Q_{rx}$ of the equation (42) to compensate the influence of the reception IQ imbalance.

It is assumed that $y'(t)$ is a signal in which the reception IQ imbalance is already compensated for the digital signal $y(t)$. For the purpose of simple explanation, the digital signal in which the reception IQ imbalance is already compensated is expressed at the time t by a vector $Y'(t)$:

$$Y'(t) = \begin{bmatrix} y'(t) \\ \{y'(t)\}* \end{bmatrix} \quad (43)$$

At this point, using an equation (44), the reception IQ imbalance compensation unit 802 performs the compensation to the digital signal $Y(t)$ in order to remove the influence of the reception IQ imbalance:

$$Y'(t)=Q'^{-1}_{rx}Y(t) \quad (44)$$

When the estimate of the reception IQ imbalance matrix is completely performed ($Q'_{rx}=Q_{rx}$), the equation (44) can be expanded into an equation (45) using the equation (42). As can be seen from the equation (45), the influence of the reception IQ imbalance (term of $Q_{rx}$) is removed:

$$\begin{aligned} Y'(t) &= Q^{-1}_{rx}Y(t) \\ &= Q^{-1}_{rx}Q_{rx}Y_0(t) \\ &= Y_0(t) \end{aligned} \quad (45)$$

Effect of Third Embodiment

Thus, in the configuration of the OFDM receiver of the third embodiment, the IQ imbalance compensation is applied to the OFDM signal before the OFDM signal is fed into the FFT unit. In the configuration of the OFDM receiver of the third embodiment, the influence of the reception IQ imbalance can be compensated, and the transmission data can be demodulated with high accuracy.

Fourth Embodiment

An OFDM transmitter according to a fourth embodiment of the invention has the same configuration as the first embodiment of FIG. 2.

Figure 9:
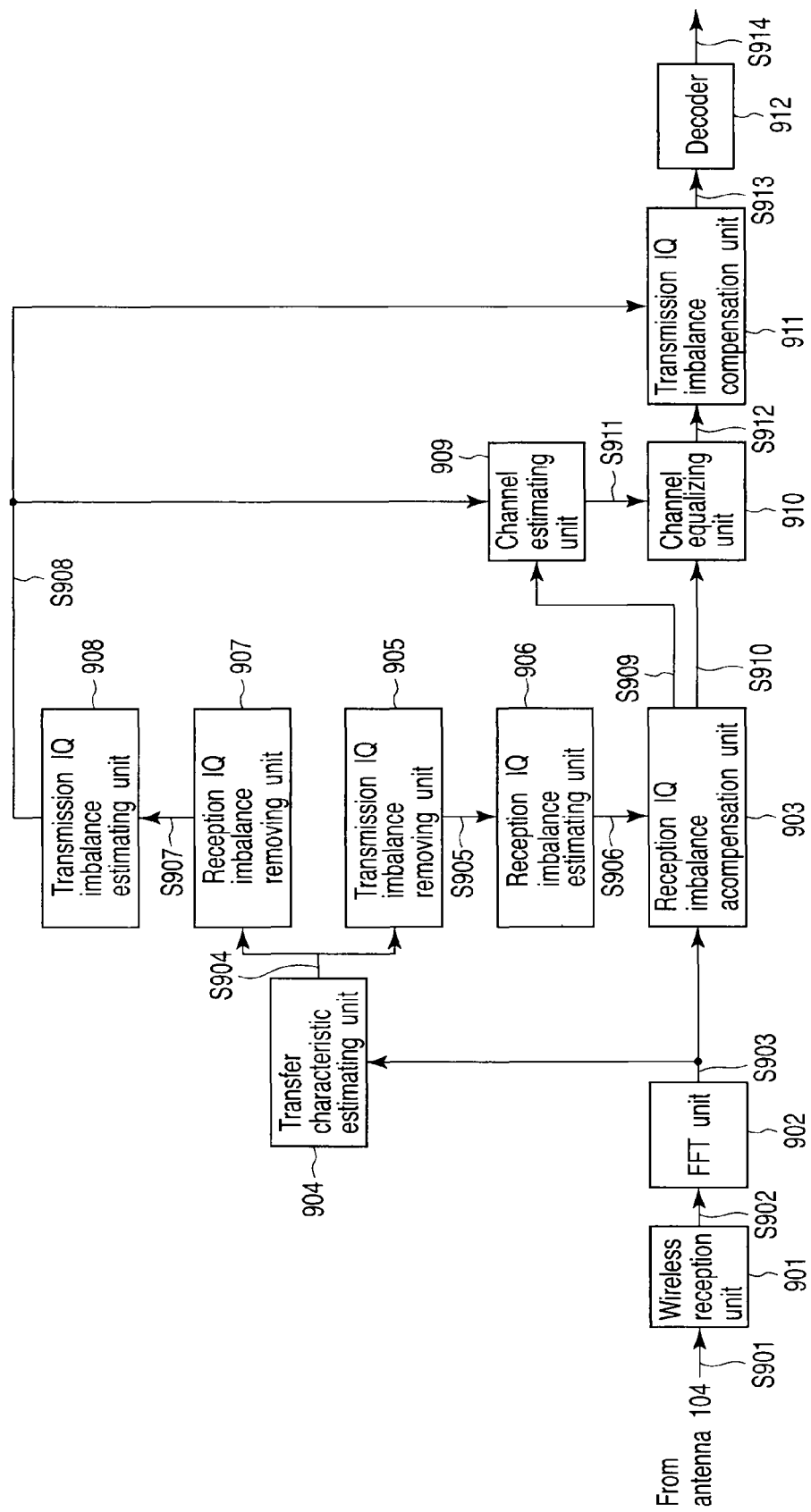
FIG. 9 shows a configuration of an OFDM signal receiver according to the fourth embodiment.

FIG. 9 shows a configuration of the OFDM transmitter of the fourth embodiment. The OFDM receiver 103 of the fourth embodiment will be described below with reference to FIG. 9.

The OFDM receiver 103 includes a wireless reception unit 901 having a quadrature demodulator, an FFT (Fast Fourier Transform) unit 902, a reception IQ imbalance compensation unit 903, a transfer characteristic estimating unit 904, a transmission IQ imbalance removing unit 905, a reception IQ imbalance estimating unit 906, a reception IQ imbalance removing unit 907, a transmission IQ imbalance estimating unit 908, a channel estimating unit 909, a channel equalizing unit 910, a transmission IQ imbalance compensation unit 911, and a decoder 912.

The wireless reception unit 901 performs the frequency conversion of an OFDM signal S901 received through the receiving antenna 104 into the baseband signal, and converts the baseband signal into a digital signal S902. The digital signal S902 supplied from the wireless reception unit 901 is fed into the FFT unit 902, which performs the fast Fourier transform to the digital signal S902 to divide the digital signal S902 into signals S903 in each subcarrier.

In the signals S903 in each subcarrier, the signal corresponding to the reception channel estimating preamble signal $Z_{rx}(k)$ and the signal corresponding to the reception data signal $D_{rx}(k)$ are fed into the reception IQ imbalance compensation unit 903. In the signal S903 supplied from the FFT unit 902, the signal corresponding to the reception pilot signal $P_{rx}(k)$ is fed into the transfer characteristic estimating unit 904.

Using the reception pilot signal $P_{rx}(k)$, the transfer characteristic estimating unit 904 produces the transfer characteristic $C(k)$, in which the transmission IQ imbalance, the channel characteristic, and the reception IQ imbalance are combined, for the two subcarrier pairs of the subcarrier numbers $\pm k_1$ and $\pm k_2$. Information S904 on the transfer characteristic estimated by the transfer characteristic estimating unit 904 is fed into the transmission IQ imbalance removing unit 905 and the reception IQ imbalance removing unit 907.

Using the transfer characteristic matrix estimate values S904 concerning the two subcarrier pairs of the subcarrier numbers $\pm k_1$ and $\pm k_2$, the transmission IQ imbalance removing unit 905 produces the transfer characteristic in which the influence of the transmission IQ imbalance is removed. The transmission IQ imbalance removing unit 905 supplies a signal S905 indicating the transfer characteristic to the reception IQ imbalance estimating unit 906.

The reception IQ imbalance estimating unit 906 estimates the reception IQ imbalance characteristic from the transfer characteristic in which the influence of the transmission IQ imbalance is removed, and the reception IQ imbalance estimating unit 906 supplies a signal S906 indicating the reception IQ imbalance characteristic to the reception IQ imbalance compensation unit 903.

Using the transfer characteristic matrix estimate values S904 concerning the two subcarrier pairs of the subcarrier numbers $\pm k_1$ and $\pm k_2$, the reception IQ imbalance removing unit 907 produces the transfer characteristic in which the influence of the reception IQ imbalance is removed. The reception IQ imbalance removing unit 907 supplies a signal S907 indicating the transfer characteristic to the transmission IQ imbalance estimating unit 908.

The transmission IQ imbalance estimating unit 908 estimates the transmission IQ imbalance characteristic from the transfer characteristic in which the influence of the reception IQ imbalance is removed, and the transmission IQ imbalance estimating unit 908 supplies a signal S908 indicating the transmission IQ imbalance characteristic to the channel estimating unit 909 and the transmission IQ imbalance compensation unit 911.

The reception IQ imbalance compensation unit 903 performs the processing for compensating the influence of the reception IQ imbalance to the channel estimating preamble signal $Z_{rx}(k)$ and data signal $D_{rx}(k)$, fed from the FFT unit 902, according to the computed reception IQ imbalance characteristic S906.

A channel estimating preamble signal S909 and a data signal S910, in which the influence of the reception IQ imbalance is compensated, are fed into the channel estimating unit 909 and channel equalizing unit 910 respectively.

The channel estimating unit 909 estimates the channel characteristic using the transmission IQ imbalance characteristic S908 and the channel estimating preamble signal S909, and supplies a signal S911 indicating the estimated channel characteristic to the channel equalizing unit 910.

The channel equalizing unit 910 performs the equalization to the data signal S910 in order to remove the channel distortion according to the estimated channel characteristic, and supplies a data signal S912 to which the equalization is performed to the transmission IQ imbalance compensation unit 911.

The transmission IQ imbalance compensation unit 911 performs the processing for compensating the influence of the transmission IQ imbalance to the data signal S912, fed from the channel equalizing unit 910, according to the computed transmission IQ imbalance characteristic S908. A data signal S913, in which the influence of the transmission IQ imbalance is compensated, is fed into the decoder 912.

The decoder 912 decodes the data signal S913, in which the influence of the transmission IQ imbalance is compensated, to supply reproduction data S914 of the transmission data.

The OFDM receiver of the fourth embodiment performs the same processing as the OFDM receiver of the first embodiment shown in FIG. 5 except for the reception IQ imbalance removing unit 907, the transmission IQ imbalance estimating unit 908, the channel estimating unit 909, and the transmission IQ imbalance compensation unit 911. The detailed processing of the reception IQ imbalance removing unit 907, transmission IQ imbalance estimating unit 908, channel estimating unit 909, channel equalizing unit 910, and transmission IQ imbalance compensation unit 911 shown in FIG. 9 will be described below.

The reception IQ imbalance removing unit 907 produces the transfer characteristic, in which the influence of the reception IQ imbalance is removed, using the transfer characteristic matrix estimate values $C'(k_1)$ and $C'(k_2)$ concerning the subcarrier numbers $\pm k_1$ and $\pm k_2$ supplied from the transfer characteristic estimating unit 904. Assuming that a matrix B is the transfer characteristic in which the influence of the reception IQ imbalance is removed, the reception IQ imbalance removing unit 907 computes the matrix B from an equation (46) using the transfer characteristic matrix estimate values $C'(k_1)$ and $C'(k_2)$ concerning the two subcarrier pairs of the subcarrier numbers $\pm k_1$ and $\pm k_2$:

$$B = \{C'(k_1)\}^{-1} C'(k_2) \quad (46)$$

Because the equation (17) holds in the case where the channel response temporal fluctuation in the frame, the temporal fluctuations of the transmission IQ imbalance and reception IQ imbalance, and the thermal noise are ignored, the equation (46) can be expanded into an equation (47). As can be seen from the equation (47), the influence of the reception IQ imbalance (term of $Q_{rx}$) is removed:

$$\begin{aligned} B &= \{C'(k_1)\}^{-1} C'(k_2) \\ &= \{C(k_1)\}^{-1} C(k_2) \\ &= \{Q_{rx} H(k_1) Q_{tx}\}^{-1} Q_{rx} H(k_2) Q_{tx} \quad (\because \text{equation (15)}) \\ &= Q_{tx}^{-1} \{H(k_1)\}^{-1} Q_{rx}^{-1} Q_{rx} H(k_2) Q_{tx} \\ &= Q_{tx}^{-1} \{H(k_1)\}^{-1} H(k_2) Q_{tx} \\ &= Q_{tx}^{-1} D_B Q_{tx} \end{aligned}$$ (47)

where $D_B$ is a diagonal matrix given by the following equation.

$$D_B = \{H(k_1)\}^{-1} H(k_2) \qquad (48)$$
$$= \begin{bmatrix} \gamma_1 & 0 \\ 0 & \gamma_2 \end{bmatrix} \begin{pmatrix} \gamma_1 = h(k_2)/h(k_1) \\ \gamma_2 = \{h(-k_2)\}^*/\{h(-k_1)\}^* \end{pmatrix}$$

The reception IQ imbalance removing unit 907 supplies the signal S907 to the transmission IQ imbalance estimating unit 908. The signal S907 indicates the transfer characteristic matrix B in which the reception IQ imbalance is already removed, and the transfer characteristic matrix B is obtained by the computation of the equation (46).

A principal property of the transfer characteristic matrix B computed from the equation (46) will be described below. For the purpose of convenience, an inverse matrix $Q^{-1}_{tx}$ of the reception IQ imbalance matrix $Q_{tx}$ defined by the equation (12) is expressed in terms of vectors $F_1$ and $F_2$ as follows:

$$Q_{tx}^{-1} = [F_1 \ F_2] \qquad (49)$$
$$\left( F_1 = \frac{1}{|\alpha_{tx}|^2 + |\beta_{tx}|^2} \begin{bmatrix} \alpha_{tx}^* \\ -\beta_{tx}^* \end{bmatrix}, F_2 = \frac{1}{|\alpha_{tx}|^2 + |\beta_{tx}|^2} \begin{bmatrix} -\beta_{tx} \\ \alpha_{tx} \end{bmatrix} \right)$$

As described above, the transfer characteristic matrix B computed from the equation (46) can be expressed by the equation (47) in the case where the channel response temporal fluctuation in the frame, the temporal fluctuations of the transmission IQ imbalance and reception IQ imbalance, and the thermal noise are ignored. The equation (47) can further be deformed into an equation (50) using the equations (48) and (49):

$$\begin{aligned} B &= Q_{tx}^{-1} D_B Q_{tx} \\ B Q_{tx}^{-1} &= Q_{tx}^{-1} D_B \\ B[F_1 \ F_2] &= [F_1 \ F_2] \begin{bmatrix} \gamma_1 & 0 \\ 0 & \gamma_2 \end{bmatrix} \\ [BF_1 \ BF_2] &= [\gamma_1 F_1 \ \gamma_2 F_2] \end{aligned}$$ (50)

An equation (51) is obtained from the equation (50).

$$BF_i = \gamma_i F_i \ (i=1,2) \qquad (51)$$

In the equation (51), $\gamma_i$ is an eigenvalue of the matrix B and $F_i$ is an eigenvector of the matrix B corresponding to the eigenvalue $\gamma_i$. That is, the two eigenvectors obtained from the transfer characteristic matrix B are equal to the vectors $F_1$ and $F_2$ constituting the inverse matrix $Q^{-1}_{tx}$ of the reception IQ imbalance matrix $Q_{tx}$.

The transmission IQ imbalance estimating unit 908 estimates the transmission IQ imbalance matrix $Q_{tx}$ by utilizing the property of the transfer characteristic matrix B. Specifically, the two eigenvectors concerning the transfer characteristic matrix B are computed to obtain the inverse matrix $Q^{-1}_{tx}$ of the transmission IQ imbalance matrix $Q_{tx}$.

The transmission IQ imbalance estimating unit 908 computes the two eigenvectors concerning the transfer characteristic matrix B using the transfer characteristic matrix B supplied from the reception IQ imbalance removing unit 907. In the following description, the two eigenvectors computed from the transfer characteristic matrix B are expressed as follows:

$$W_1 = [w_1(1) \ w_1(2)]^T$$

$$W_2 = [w_2(1) \ w_2(2)]^T$$

where T is transpose computation.

Then, the transmission IQ imbalance estimating unit 908 estimates an inverse matrix of the transmission IQ imbalance matrix $Q_{tx}$ from the two eigenvectors $W_1$ and $W_2$. Assuming that the phase error $\phi_{tx}$ of the transmission IQ imbalance falls within a range of $-\pi/2 < \phi_{tx} < \pi/2$, a relational expression of $|\alpha_{tx}| > |\beta_{tx}|$ holds in the inverse matrix $Q^{-1}_{tx}$ shown in the equation (49). Therefore, the transmission IQ imbalance estimating unit 908 computes an inverse matrix estimate value $Q'^{-1}_{tx}$ of the transmission IQ imbalance matrix $Q_{tx}$ when the condition of $|w_1(1)| > |w_1(2)|$ is satisfied for the eigenvector $W_1$ (or when the condition of $|w_2(1)| > |w_2(2)|$ is satisfied for the eigenvector $W_2$):

$$Q'^{-1}_{tx} = [W_1 \ W_2] (|w_1(1)| > |w_1(2)| \text{ or } |w_2(2)| > |w_2(1)|) \qquad (52)$$

On the other hand, the transmission IQ imbalance estimating unit 908 computes the inverse matrix estimate value $Q'^{-1}_{tx}$ of the transmission IQ imbalance matrix $Q_{tx}$ when the condition of $|w_1(2)| \geq |v_1(1)|$ is satisfied for the eigenvector $W_1$ (or when the condition of $|w_2(1)| \geq |w_2(2)|$ is satisfied for the eigenvector $W_2$):

$$Q'^{-1}_{tx} = [W_2 \ W_1] (|w_1(2)| \geq |w_1(1)| \text{ or } |w_2(1)| \geq |w_2(2)|) \qquad (53)$$

The transmission IQ imbalance estimating unit 908 computes the transmission IQ imbalance matrix concerning the inverse matrix estimate value $Q'^{-1}_{tx}$ by computing the inverse matrix $Q'_{tx} = \{Q'^{-1}_{tx}\}^{-1}$. The inverse matrix estimate value $Q'^{-1}_{tx}$ is computed by the equation (52) or (53).

The transmission IQ imbalance estimating unit 908 supplies the signal S908 indicating the transmission IQ imbalance matrix estimate value $Q'_{tx}$ to the channel estimating unit 909 and the transmission IQ imbalance compensation unit 911.

Although the transmission IQ imbalance estimating unit 908 of the fourth embodiment supplies the transmission IQ imbalance matrix estimate value $Q'_{tx}$ to the channel estimating unit 909 and the transmission IQ imbalance compensation unit 911, the transmission IQ imbalance estimating unit 908 may supply the estimate value $Q'^{-1}_{tx}$ of the inverse matrix of the transmission IQ imbalance matrix $Q_{tx}$.

The channel estimating unit 909 estimates the channel characteristic using the transmission IQ imbalance matrix estimate value $Q'_{tx}$ supplied from the transmission IQ imbalance estimating unit 908 and the channel estimating preamble signal $Z'_{rx}(k)$ supplied from the reception IQ imbalance compensation unit 903. It is assumed that h'(k) is an estimate value of the channel characteristic h(k) in the k-th subcarrier.

For the purpose of simple explanation, the channel characteristic estimate values in the ±k-th subcarriers (k∈$S_z^+$) are expressed by a matrix H'(k) of an equation (54):

$$H'(k) = \begin{bmatrix} h'(k) & 0 \\ 0 & \{h'(-k)\}^* \end{bmatrix} \quad (k \in S_z^+) \tag{54}$$

At this point, the channel estimating unit 909 estimates the channel matrix H'(k) from processing expressed by an equation (55):

$$H'(k) = Z'_{rx}(k)\{Z_{tx}(k)\}^{-1} Q'^{-1}_{tx} \tag{55}$$

Assuming that not only the estimate of the transmission IQ imbalance matrix is completely performed ($Q'_{tx}=Q_{tx}$) but also the equation (31) holds, the equation (55) is expanded as follows, so that the channel matrix H(k) can correctly be estimated:

$$\begin{aligned} H'(k) &= Z'_{rx}(k)\{Z_{tx}(k)\}^{-1} Q'^{-1}_{tx} \\ &= H(k)Q_{tx}Z_{tx}(k)\{Z_{tx}(k)\}^{-1} Q'^{-1}_{tx} \\ &= H(k) \end{aligned} \tag{56}$$

The channel estimating unit 909 supplies the signal S911 indicating the channel matrix H'(k) computed by the equation (55) to the channel equalizing unit 910.

An example of the processing performed by the channel equalizing unit 910 will be described below. The channel equalization can be performed by a well-known technique.

The channel equalizing unit 910 performs the equalization to the data signal $D'_{rx}(k)$ supplied from the reception IQ imbalance compensation unit 903 in order to remove the channel distortion. It is assumed that $d_{eq}(k,n)$ is a signal in which the channel distortion is already removed from the data signal $d'_{rx}(k,n)$ in which the reception IQ imbalance is already compensated.

For the purpose of simple explanation, the data signals in which the channel distortions are already removed in ±k-th subcarriers (k∈$S_d^+$) are expressed by a vector $D_{eq}(k)$ of an equation (57):

$$D_{eq}(k) = \begin{bmatrix} d_{eq}(k, n) \\ \{d_{eq}(k, n)\}^* \end{bmatrix} (k \in S_d^+) \tag{57}$$

At this point, through processing of an equation (58), the channel equalizing unit 910 performs the compensation to the data signal $D_{eq}(k)$ in order to remove the influence of the channel distortion:

$$D_{eq}(k) = \{H'(k)\}^{-1} D'_{rx}(k) \quad (k \in S_d^+) \tag{58}$$

Assuming that not only the estimate of the transmission channel matrix is completely performed (H'(k)=H(k)) but also the equation (30) holds, the equation (58) can be expanded into an equation (59). As can be seen from the equation (59), the influence of the channel distortion H(k) is removed:

$$\begin{aligned} D_{eq}(k) &= \{H'(k)\}^{-1} D'_{rx}(k) \\ &= \{H'(k)\}^{-1} H(k) Q_{tx} D_{tx}(k) \\ &= Q_{tx} D_{tx}(k) \end{aligned} \tag{59}$$

The channel equalizing unit 910 supplies the signal S912 to the transmission IQ imbalance compensation unit 911. The signal S912 indicates the data signal $D_{eq}(k)$ in which the equalization of the channel distortion is already performed by the computation of the equation (58).

When the transmission IQ imbalance estimating unit 908 supplies the signal S908 indicating the transmission IQ imbalance matrix estimate value $Q'_{tx}$ to the transmission IQ imbalance compensation unit 911, the transmission IQ imbalance compensation unit 911 performs the compensation to the data signal $D_{eq}(k)$, in which the channel distortion is already removed, in order to remove the influence of the transmission IQ imbalance. More specifically, the transmission IQ imbalance compensation unit 911 removes the transmission IQ imbalance matrix $Q_{tx}$ of the equation (59) to compensate the inter-subcarrier interference caused by the transmission IQ imbalance. It is assumed that $d'_{eq}(k,n)$ is a signal in which the compensation of the transmission IQ imbalance is performed to the data signal $d_{eq}(k,n)$ whose channel distortion is already removed. For the purpose of simple explanation, the signal in which the transmission IQ imbalance compensation is already performed in ±k-th subcarriers (k∈$S_d^+$) is expressed by a vector $D'_{eq}(k)$ of an equation (60):

$$D'_{eq}(k) = \begin{bmatrix} d'_{eq}(+k, n) \\ \{d'_{eq}(-k, n)\}^* \end{bmatrix} (k \in S_d^+) \tag{60}$$

At this point, through processing of an equation (61), the transmission IQ imbalance compensation unit 911 performs the compensation to the data signal $D_{eq}(k)$ in which the channel distortion is already removed in order to remove the influence of the transmission IQ imbalance:

$$D'_{eq}(k) = Q'^{-1}_{tx} D_{eq}(k) \quad (k \in S_d^+) \tag{61}$$

Assuming that not only the estimate of the transmission IQ imbalance matrix is completely performed ($Q'_{tx}=Q_{tx}$) but also the equation (59) holds, the equation (61) can be expanded into an equation (62). As can be seen from the equation (62), the influence of the transmission IQ imbalance (term of $Q_{tx}$) is removed:

$$\begin{aligned} D'_{eq}(k) &= Q'^{-1}_{tx} D_{eq}(k) \\ &= Q^{-1}_{tx} Q_{tx} D_{tx}(k) \\ &= D_{tx}(k) \end{aligned} \tag{62}$$

Effect of Fourth Embodiment

Thus, in the OFDM receiver of the fourth embodiment, the transfer characteristics concerning the two pairs of pilot signals in the subcarriers symmetrically located in relation to the center frequency are estimated, the influence of the transmission IQ imbalance is removed using the two pairs of estimated transfer characteristics, and the reception IQ imbalance characteristic is estimated. The transmission IQ imbalance characteristic is also estimated after the influence of the reception IQ imbalance is removed using the two pairs of estimated transfer characteristics.

Then, using the estimated reception IQ imbalance characteristics and transmission IQ imbalance characteristics, the compensation is performed to remove the influences of both the reception IQ imbalance and transmission IQ imbalance.

In the fourth embodiment, the compensation is performed not only to the influence of the reception IQ imbalance but also to the influence of the transmission IQ imbalance, so that the data signal can be demodulated with higher accuracy.

Fifth Embodiment

Figure 10:
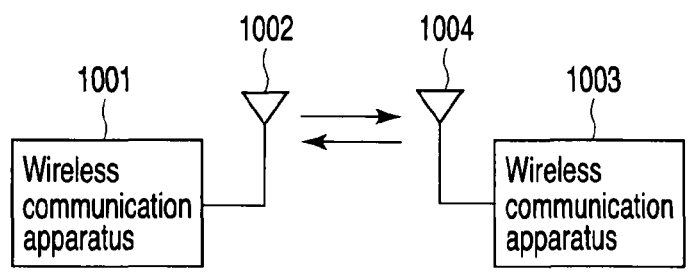
FIG. 10 shows a configuration of a communication system according to fifth and sixth embodiments of the invention.

As shown in FIG. 10, in a wireless communication system according to a fifth embodiment of the invention, a wireless communication apparatus 1001 having an antenna 1002 transmits a radio-frequency band signal, and a wireless communication apparatus 1003 having an antenna 100 receives the radio-frequency band signal. The wireless communication apparatus 1003 having the antenna 1004 transmits the radio-frequency band signal, and the wireless communication apparatus 1001 having the antenna 1002 receives the radio-frequency band signal.

In the fifth embodiment, each of the wireless communication apparatus 1001 and the wireless communication apparatus 1003 includes the one antenna. Alternatively, each of the wireless communication apparatus 1001 and the wireless communication apparatus 1003 may include plural antennas. The signals transmitted by the wireless communication apparatus 1001 and the wireless communication apparatus 1003 are not limited to the OFDM signal. The wireless communication apparatus 1001 and the wireless communication apparatus 1003 can transmit a signal such as a single-carrier signal and a code division multiple signal to which any transmission method is applied.

In the first to fourth embodiments, the OFDM receiver 103 estimates the reception IQ imbalance characteristic using the pilot signal transmitted from the OFDM transmitter 101. On the other hand, in the fifth embodiment, the wireless communication apparatus 1003 produces the pilot signal therein, and estimates the reception IQ imbalance characteristic using the pilot signal.

The wireless communication apparatus 1003 will be described with reference to FIG. 11. The wireless communication apparatus 1003 includes a pilot signal generating unit 1101, a transmission signal generating unit 1102, a wireless transmission unit 1103 having a quadrature modulator, a switch 1104, a wireless reception unit 1105 having a quadrature demodulator, a frequency separation unit 1106, a transfer characteristic estimating unit 1107, a transmission IQ imbalance removing unit 1108, a reception IQ imbalance estimating unit 1109, and a reception processing unit 1110.

The wireless communication apparatus 1003 has three kinds of modes, that is, (A) a pre-processing mode, (B) a reception processing mode, and (C) a transmission processing mode, and the wireless communication apparatus 1003 performs different pieces of processing according to the modes. The processing performed by the wireless communication apparatus 1003 in each mode will be described below.

(A) Operation in Pre-Processing Mode

The wireless communication apparatus 1003 performs pre-processing before making a transition to the reception processing mode. When the wireless communication apparatus 1003 makes the transition to the pre-processing mode, the pilot signal generating unit 1101 produces a digital signal S1101 in which transmission pilot signals are allocated to plural frequency components, and the pilot signal generating unit 1101 supplies the produced digital signal S1101 to the wireless transmission unit 1103. The wireless transmission unit 1103 converts the digital signal S1101 into an analog signal, and performs the frequency conversion of the analog signal into a signal having a radio-frequency band (RF), thereby producing an RF signal S1103.

The RF signal S1103 supplied from the wireless transmission unit 1103 is fed into the switch 1104. In the pre-processing mode, the switch 1104 connects a terminal T2 and a terminal T3 to feed the RF signal S1103 into the wireless reception unit 1105.

In the fifth embodiment, a channel characteristic shall mean a characteristic in which a frequency characteristic of the wireless transmission unit 1103, a frequency characteristic possessed by a channel from the wireless transmission unit 1103 to the wireless reception unit 1105, and a frequency characteristic of the wireless reception unit 1105 are combined. Although not shown, a unit (such as an analog filter) may be inserted in one of the wireless transmission unit 1103, the channel from the wireless transmission unit 1103 to the wireless reception unit 1105, and the wireless reception unit 1105 to additionally impart a frequency characteristic.

The wireless reception unit 1105 performs the frequency conversion of the RF signal S1103 supplied from the wireless transmission unit 1103 into the baseband signal, and converts the baseband signal into a digital signal S1106. It is not always necessary that the wireless transmission unit 1103 and the wireless reception unit 1105 individually have the oscillators, but the one oscillator may be shared by the wireless transmission unit 1103 and the wireless reception unit 1105.

The digital signal S1106 supplied from the wireless reception unit 1105 is fed into the frequency separation unit 1106. The frequency separation unit 1106 separates the digital signal S1106 into reception pilot signals S1107 in each frequency component, and supplies the reception pilot signals S1107 to the transfer characteristic estimating unit 1107. In the frequency separation unit 1106, a well-known technique in which FFT or a filter bank is used can be adopted to separate the digital signal into the frequency components.

The transfer characteristic estimating unit 1107 estimates the transfer characteristic from the reception pilot signal S1107. The transmission IQ imbalance generated in the wireless transmission unit 1103, the channel characteristic, and the reception IQ imbalance generated in the wireless reception unit 1105 are combined in the transfer characteristic. The transfer characteristic estimating unit 1107 supplies information S1108 indicating the estimated transfer characteristic to the transmission IQ imbalance removing unit 1108.

The transmission IQ imbalance removing unit 1108 produces the transfer characteristic in which the influence of the transmission IQ imbalance is removed, and the transmission IQ imbalance removing unit 1108 supplies a signal S1109 indicating the transfer characteristic to the reception IQ imbalance estimating unit 1109.

The reception IQ imbalance estimating unit 1109 estimates the reception IQ imbalance characteristic from the transfer characteristic, and supplies a signal S1110 indicating the reception IQ imbalance characteristic to the reception processing unit 1110.

Figure 12:
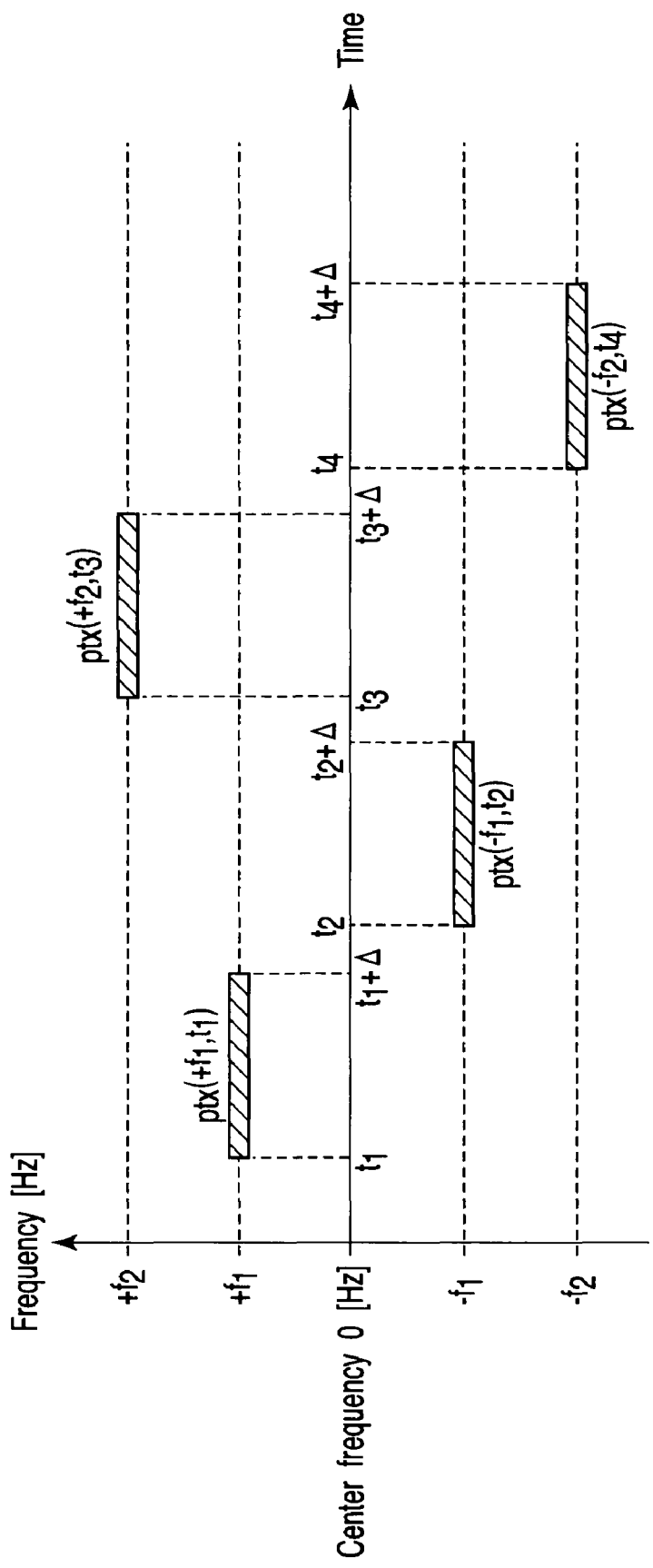
FIG. 12 shows a configuration of a pilot signal according to the fifth and sixth embodiments.

FIG. 12 shows a configuration of the digital signal S1101 produced by the pilot signal generating unit 1101.

In an interval from a time $t_1$ to a time $t_1+\Delta$, the pilot signal is transmitted at a frequency $+f_1$. In an interval from a time $t_2$ to a time $t_2+\Delta$, the pilot signal is transmitted at a frequency $-f_1$. In an interval from a time $t_3$ to a time $t_3+\Delta$, the pilot signal is transmitted at a frequency $+f_2$. In an interval from a time $t_4$ to a time $t_4+\Delta$, the pilot signal is transmitted at a frequency $-f_2$. In an interval from a time $t_n$ to a time $t_n+\Delta$, a pilot signal transmitted at a frequency f is defined by $p_{tx}(f,t_n)$. At this point, a relationship of n=2k−1 holds for the pilot signal transmitted with a positive frequency $+f_k$ (k=1, 2), and a relationship of n=2k holds for the pilot signal transmitted with a negative frequency $-f_k$ (k=1, 2).

The pilot signals are transmitted with a pair of frequencies symmetrically located in relation to the center frequency. That is, assuming that $S_f$ is a frequency pair with which the pilot signals are transmitted, $-f_k \in S_f$ holds in the case of $+f_k \in S_f$.

In the fifth embodiment, the pilot signals are transmitted at different times in each frequency. However, the method of transmitting the pilot signals is not limited to the fifth embodiment. When the two pilot signals symmetrically located in relation to the center frequency are transmitted at different times, the pilot signals can arbitrarily be transmitted. For example, the two pilot signals $p_{tx}(+f_1,t_1)$ and $p_{tx}(+f_2,t_3)$ which are not in symmetrical relation to the center frequency may be transmitted at the same time $t_1=t_3$. The pilot signals may be transmitted in the order of $t_2=t_3<t_4<t_1$.

For the purpose of simple explanation, the two pilot signals transmitted at the $\pm f_k$ frequencies are expressed by a matrix $P_{tx}(f_k)$ of an equation (63):

$$P_{tx}(f_k) = \begin{bmatrix} p_{tx}(+f_k, t_{2k-1}) & 0 \\ 0 & \{p_{tx}(-f_k, t_{2k})\}^* \end{bmatrix} \ (k=1,2) \quad (63)$$

In the signals S1107 separated in each frequency component, assuming that $p_{rx}(f,t_n)$ is a pilot signal received at a frequency f in an interval from time $t_n$ to time $t_n+\Delta$, the reception pilot signals at $\pm k$ frequencies are expressed by a matrix $P_{rx}(f_k)$ of an equation (64):

$$P_{rx}(f_k) = \begin{bmatrix} p_{rx}(+f_k, t_{2k-1}) & p_{rx}(+f_k, t_{2k}) \\ \{p_{rx}(-f_k, t_{2k-1})\}^* & \{p_{rx}(-f_k, t_{2k})\}^* \end{bmatrix} \ (k=1,2) \quad (64)$$

In the case where the transmission IQ imbalance and reception IQ imbalance are generated in the wireless transmission unit 1103 and the wireless reception unit 1105 respectively, the reception pilot signals $P_{rx}(f_k)$ can be expressed by an equation (65):

$$P_{rx}(f_k) = Q_{rx}H(f_k)Q_{tx}P_{tx}(f_k) \quad (65)$$
$$= C(f_k)P_{tx}(f_k) \ (k=1,2)$$

Where $Q_{tx}$ and $Q_{rx}$ are the transmission IQ imbalance matrix and the reception IQ imbalance matrix given by the equations (12) and (13) respectively. $H(f_k)$ is a matrix expressing the channel characteristics at the frequencies $\pm f_k$, and $H(f_k)$ can be expressed by an equation (66) using the channel characteristic $h(+f_k)$ at the frequency $+f_k$ and the channel characteristic $h(-f_k)$ at the frequency $-f_k$:

$$H(f_k) = \begin{bmatrix} h(+f_k) & 0 \\ 0 & \{h(-f_k)\}^* \end{bmatrix} \quad (66)$$

$C(f_k)$ is a transfer characteristic matrix in which the transmission IQ imbalance $Q_{tx}$, the channel characteristics at the frequencies $\pm f_k$, and the reception IQ imbalance $Q_{rx}$ are combined, and $C(f_k)$ can be expressed by an equation (67):

$$C(f_k)=Q_{rx}H(f_k)Q_{tx} \quad (67)$$

The detailed processing performed by each of the transfer characteristic estimating unit 1107, the transmission IQ imbalance removing unit 1108, and the reception IQ imbalance estimating unit 1109 will be described below.

First, the processing performed by the transfer characteristic estimating unit 1107 will be described. The transfer characteristic estimating unit 1107 estimates the transfer characteristic matrix, in which the transmission IQ imbalance, the channel characteristic, and the reception IQ imbalance are combined, for each of the first frequency pair $\pm f_1$ and the second frequency pair $\pm f_2$. Assuming that $C'(f_k)$ is an estimate value of the transfer characteristic matrix $C(f_k)$ concerning the frequencies $\pm f_k$, the transfer characteristic estimating unit 1107 computes the transfer characteristic matrix $C'(f_k)$ from an equation (68) using the reception pilot signal $P_{rx}(f_k)$ and the known transmission pilot signal $P_{tx}(f_k)$:

$$C'(f_k)=P_{rx}(f_k)\{P_{tx}(f_k)\}^{-1} \ (k=1,2) \quad (68)$$

In the case where the transmission pilot signals are given by the equation (63), $\{P_{tx}(f_k)\}^{-1}$ can be computed by an equation (69):

$$\{P_{tx}(f_k)\}^{-1} = \begin{bmatrix} 1/p_{tx}(+f_k, t_{2k-1}) & 0 \\ 0 & 1/\{p_{tx}(-f_k, t_{2k})\}^* \end{bmatrix} \quad (69)$$
$$(k=1,2)$$

The transfer characteristic estimating unit 1107 supplies the signal S1108 to the transmission IQ imbalance removing unit 1108. The signal S1108 indicates the transfer characteristic matrix $C'(f_1)$ concerning the first frequency pair $\pm f_1$ and the transfer characteristic matrix $C'(f_2)$ concerning the second frequency $\pm f_2$, and the transfer characteristic matrix $C'(f_1)$ and the transfer characteristic matrix $C'(f_2)$ are estimated by the computation of the equation (68).

The processing performed by the transmission IQ imbalance removing unit 1108 will be described below. Using the transfer characteristic matrix estimate values $C'(f_1)$ and $C'(f_2)$ concerning the frequencies $\pm f_1$ and $\pm f_2$ given by the transfer characteristic estimating unit 1107, the transmission IQ imbalance removing unit 1108 produces the transfer characteristic in which the influence of the transmission IQ imbalance is removed. Assuming that a matrix A is the transfer characteristic in which the influence of the transmission IQ imbalance is removed, the transmission IQ imbalance removing unit 1108 computes the matrix A from an equation (70):

$$A=C'(f_1)\{C'(f_2)\}^{-1} \quad (70)$$

The transmission IQ imbalance removing unit 1108 supplies the signal S1109 indicating the transfer characteristic matrix A computed by the equation (70) to the reception IQ imbalance estimating unit 1109.

The processing performed by the reception IQ imbalance estimating unit 1109 will be described below. Using the transfer characteristic matrix A supplied from the transmission IQ imbalance removing unit 1108, the reception IQ imbalance estimating unit 1109 computes two eigenvectors concerning the transfer characteristic matrix A. The two eigenvectors computed from the transfer characteristic matrix A are expressed as follows:

$$V_1 = [v_1(1) v_1(2)]^T$$

$$V_2 = [v_2(1) v_2(2)]^T$$

Then, the reception IQ imbalance estimating unit 1109 estimates the reception IQ imbalance matrix $Q_{rx}$ from the two eigenvectors $V_1$ and $V_2$. The reception IQ imbalance estimating unit 1109 computes the reception IQ imbalance matrix estimate value $Q'_{rx}$ from an equation (71) when the condition of $|v_1(1)| > |v_1(2)|$ is satisfied for the eigenvector $V_1$ (or when the condition of $|v_2(2)| > |v_2(1)|$ is satisfied for the eigenvector $V_2$):

$$Q'_{rx} = [V_1 V_2] (|v_1(1)| > |v_1(2)| \text{ or } |v_2(2)| > |v_2(1)|) \tag{71}$$

On the other hand, the reception IQ imbalance estimating unit 1109 computes the reception IQ imbalance matrix estimate value $Q'_{rx}$ from an equation (72) when the condition of $|v_1(2)| \geq |v_1(1)|$ is satisfied for the eigenvector $V_1$ (or when the condition of $|v_2(1)| \geq |v_2(2)|$ is satisfied for the eigenvector $V_2$):

$$Q'_{rx} = [V_2 V_1] (|v_1(2)| \geq |v_1(1)| \text{ or } |v_2(1)| \geq |v_2(2)|) \tag{72}$$

The reception IQ imbalance estimating unit 1109 supplies the signal S1110 to the reception processing unit 1110. The signal S1110 indicates the reception IQ imbalance matrix estimate value $Q'_{rx}$ computed from the equation (71) or (72).

When $C'(f_1) = C'(f_2)$ holds in the transfer characteristic matrix estimate values supplied from the transfer characteristic estimating unit 1107, the transfer characteristic matrix A becomes a unit matrix by the equation (70). In such cases, unfortunately the eigenvectors of the matrix A cannot uniquely be obtained. As described above, in the case where the unit is inserted in one of the wireless transmission unit 1103, the channel from the wireless transmission unit 1103 to the wireless reception unit 1105, and the wireless reception unit 1105 to additionally impart the frequency characteristic, a probability of obtaining $C'(f_1) = C'(f_2)$ can be suppressed to a low level, and thereby the eigenvectors can uniquely be obtained.

(B) Operation of Reception Processing Mode

When the radio-frequency band signal transmitted from the wireless communication apparatus 1001 is received through the receiving antenna 1004, the wireless communication apparatus 1003 makes the transition to the reception processing mode to perform the following processing.

The radio-frequency band signal S1105 received through the receiving antenna 1004 is fed into the switch 1104. In the reception processing mode, the switch 1104 connects the terminal T1 and the terminal T3 to feed the radio-frequency band signal S1105 into the wireless reception unit 1105. The wireless reception unit 1105 performs the frequency conversion of the radio-frequency band signal S1105 fed from the switch 1104 into the baseband signal, and converts the baseband signal into the digital signal S1111. Then, the wireless reception unit 1105 supplies the digital signal S1111 to the reception processing unit 1110.

Using an equation (73), the reception processing unit 1110 performs the processing for compensating the reception IQ imbalance to the digital signal S1111 according to the reception IQ imbalance characteristic $Q'_{rx}$ supplied from the reception IQ imbalance estimating unit 1109:

$$Y'(t) = Q'^{-1}_{rx} Y(t) \tag{73}$$

Where Y(t) is a vector given by an equation (74) using a digital signal of $y(t) = y_I(t) + j y_Q(t)$ at a time t before the reception IQ imbalance is compensated ($y_I(t)$ and $y_Q(t)$ are the in-phase component signal and the orthogonal component signal, respectively, before the reception IQ imbalance is compensated):

$$Y(t) = \begin{bmatrix} y(t) \\ \{y(t)\}^* \end{bmatrix} \tag{74}$$

Y'(t) is a vector given by an equation (75) using a digital signal of $y'(t) = y'_I(t) + j y'_Q(t)$ at the time t in which the reception IQ imbalance is already compensated ($y'_I(t)$ and $y'_Q(t)$ are the in-phase component signal and the orthogonal component signal, respectively, in which the reception IQ imbalance is already compensated):

$$Y'(t) = \begin{bmatrix} y'(t) \\ \{y'(t)\}^* \end{bmatrix} \tag{75}$$

The reception processing unit 1110 supplies reproduction data S1112 of transmission data by performing reception processing (such as channel estimate, channel equalization, and decoding processing) matched with the frame configuration or transmission method of the signal to the signal in which the reception IQ imbalance is already compensated.

In the case where the reception processing unit 1110 includes the frequency separation unit such as the FFT unit, the frequency separation unit 1106 used in the pre-processing mode can be replaced by the frequency separation unit included in the reception processing unit 1110.

In the case where not only the reception processing unit 1110 includes the frequency separation unit such as the FFT unit but also the frequency separation unit separates the digital signal S1111 in each frequency component, the reception IQ imbalance can be compensated by performing an equation (76) instead of the equation (73):

$$Y'(f_k) = Q'^{-1}_{rx} Y(f_k) \tag{76}$$

Where $Y(f_k)$ is a vector given by an equation (77) using the signal $y(+f_k)$ of the frequency component $+f_k$ and the signal $y(-f_k)$ of the frequency component $-f_k$. The signal $y(+f_k)$ and the signal $y(-f_k)$ are included in the digital signal separated in each frequency component:

$$Y'(f_k) = \begin{bmatrix} y(+f_k) \\ \{y(-f_k)\}^* \end{bmatrix} \tag{77}$$

$Y'(f_k)$ is a vector given by an equation (78) using the signal $y'(+f_k)$ of the frequency component $+f_k$ and the signal $y'(-f_k)$ of the frequency component $-f_k$ in which the reception IQ imbalance is already compensated:

$$Y'(f_k) = \begin{bmatrix} y'(+f_k) \\ \{y'(-f_k)\}^* \end{bmatrix} \tag{78}$$

(C) Operation in Transmission Processing Mode

When transmitting the signal to the wireless communication apparatus 1001, the wireless communication apparatus 1003 makes the transition to the transmission processing mode to perform the following processing.

The transmission signal generating unit 1102 produces a digital signal having any frame configuration or transmission method in order to transmit the digital signal to the wireless communication apparatus 1001, and supplies the digital signal S1102 to the wireless transmission unit 1103.

The wireless transmission unit 1103 converts the digital signal S1102 into the analog signal, and performs the frequency conversion of the analog signal into the signal having the radio-frequency band to produce the RF signal S1103. The RF signal S1103 is fed into the switch 1104.

In the transmission processing mode, the switch 1104 connects the terminal T1 and the terminal T2, and supplies the RF signal S1103 supplied from the wireless transmission unit 1103 in the form of the transmission signal S1104 to the antenna 1004. The transmission signal S1104 is transmitted through the transmitting antenna 1004.

Effect of Fifth Embodiment

Thus, the wireless communication apparatus 1003 of the fifth embodiment estimates the transfer characteristics concerning the two pilot signal pairs which are the frequency component symmetrically located in relation to the center frequency, removes the influence of the transmission IQ imbalance using the estimated two transfer characteristic pairs, and then estimates the reception IQ imbalance characteristic. Therefore, the reception IQ imbalance characteristic can be estimated with high accuracy without an influence of an error caused by the transmission IQ imbalance.

In the wireless communication apparatus 1003 of the fifth embodiment, the pilot signals are produced in the wireless communication apparatus 1003, and the reception IQ imbalance characteristic is estimated using the pilot signals. Therefore, the reception IQ imbalance characteristic can be estimated by the individual wireless communication apparatus 1003 without the use of the signal from another wireless communication apparatus.

In the case where one oscillator is shared by the wireless transmission unit 1103 and the wireless reception unit 1105, a frequency error (frequency offset) is not generated between the wireless transmission unit and the wireless reception unit, so that the reception IQ imbalance characteristic can be estimated without the influence of the error caused by the frequency offset.

(Modifications)

In the wireless communication apparatus 1003 of the fifth embodiment, the pilot signals are produced in the wireless communication apparatus 1003. Alternatively, similarly to the first embodiment, another wireless communication apparatus such as the wireless communication apparatus 1001 may transmit the pilot signals and the wireless communication apparatus 1003 estimates the reception IQ imbalance using the pilot signals. At this point, similarly to the first embodiment, the channel characteristic shall mean the frequency characteristic possessed by the wireless propagation channel from the wireless communication apparatus 1001 to the wireless communication apparatus 1003 (the frequency characteristic of the wireless transmission unit 1103 or the frequency characteristic of the wireless reception unit 1105 may be included).

In the case where another wireless communication apparatus transmits the pilot signals, another wireless communication apparatus may concurrently transmit the data signals using the frequency, time, code system, and transmitting antenna which are different from those of the pilot signal.

As for the pilot signals of the fifth embodiment, as shown in FIG. 12, the two pilot signals symmetrically located in relation to the center frequency are transmitted at different times, the invention is not limited to the fifth embodiment. For example, as shown in FIG. 13, the two pilot signals symmetrically located in relation to the center frequency may be transmitted at the same time.

Figure 13:
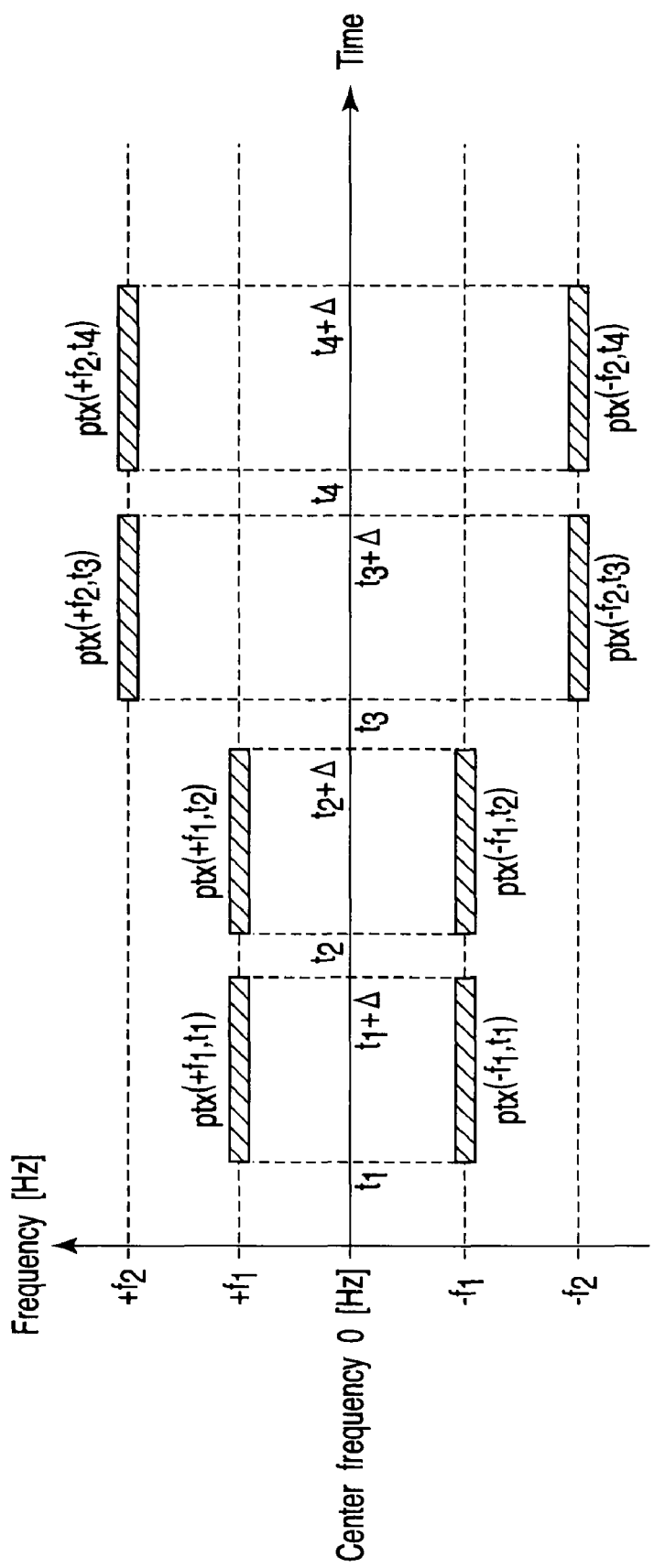
FIG. 13 shows another configuration of the pilot signal according to the fifth and sixth embodiments.

Referring to FIG. 13, the pilot signals $p_{tx}(+f_1,t_1)$ and the $p_{tx}(-f_1,t_1)$ are transmitted in the interval from the time $t_1$ to the time $t_1+\Delta$. The pilot signals $p_{tx}(+f_1,t_2)$ and the $p_{tx}(-f_1,t_2)$ are transmitted in the interval from the time $t_2$ to the time $t_2+\Delta$. The pilot signals $p_{tx}(+f_2,t_3)$ and the $p_{tx}(-f_2,t_3)$ are transmitted in the interval from the time $t_3$ to the time $t_3+\Delta$. The pilot signals $p_{tx}(+f_2,t_4)$ and the $p_{tx}(-f_2,t_4)$ are transmitted in the interval from the time $t_4$ to the time $t_4+\Delta$.

When the pilot signals transmitted at the same frequency are transmitted at different times, the pilot signals can be transmitted at any time. For example, the pilot signals transmitted at the frequency $\pm f_1$ in the interval the from time $t_1$ to the time $t_1+\Delta$ and the pilot signals transmitted at the frequency $\pm f_2$ in the interval from the time $t_3$ to the time $t_3+\Delta$ may be transmitted at the same time $t_1=t_3$. The pilot signals may be transmitted in the order of $t_2=t_3<t_4<t_1$.

The pilot signal shown in FIG. 13 expresses a general system of the pilot signal used in the invention. It can be said that the pilot signal shown in FIG. 12 is an example in which $p_{tx}(+f_1,t_2)$, $p_{tx}(-f_1,t_1)$, $p_{tx}(+f_2,t_4)$, and $p_{tx}(-f_2,t_3)$ of the pilot signals shown in FIG. 13 are set to zero.

In the case where the pilot signals of FIG. 13 which is a general system of the pilot signal is used, a transmission pilot signal matrix $P_{tx}(f_k)$ is defined by an equation (79) and then the pre-processing is performed:

$$P_{tx}(f_k) = \begin{bmatrix} p_{tx}(+f_k, t_{2k-1}) & p_{tx}(+f_k, t_{2k}) \\ \{p_{tx}(-f_k, t_{2k-1})\}^* & \{p_{tx}(-f_k, t_{2k})\}^* \end{bmatrix} (k=1,2) \quad (79)$$

It can be thought that the equation (63) is an example in which the following equation is substituted for the equation (79):

$$p_{tx}(+f_1, t_2) = p_{tx}(-f_1, t_1)$$
$$= p_{tx}(+f_2, t_4)$$
$$= p_{tx}(-f_2, t_3)$$
$$= 0$$

It is necessary that the transmission pilot signal satisfy an equation:

$$p_{tx}(+f_k, t_{2k-1})\{p_{tx}(-f_k, t_{2k})\}^* - \qquad (80)$$
$$p_{tx}(+f_k, t_{2k})\{p_{tx}(-f_k, t_{2k}-1)\}^* \neq 0 \, (k=1,2)$$

When the transmission pilot signal satisfies the condition of the equation (80), the inverse matrix $\{P_{tx}(f_k)\}^{-1}$ can be computed to estimate the transfer characteristic matrix expressed by the equation (68).

Desirably the transmission pilot signal satisfies an equation (81):

$$p_{tx}(+f_k, t_{2k-1})p_{tx}(+f_k, t_{2k}) + \qquad (81)$$
$$\{p_{tx}(-f_k, t_{2k-1})\}^*\{p_{tx}(-f_k, t_{2k})\}^* = 0 \, (k=1,2)$$

When the transmission pilot signal satisfies the condition of the equation (81), advantageously the estimate accuracy of the equation (68) is improved in the noise environment.

Because the pilot signals of FIG. 12 are expressed as follows, the pilot signals satisfy the equations (80) and (81):

$$p_{tx}(+f_1, t_2) = p_{tx}(-f_1, t_1)$$
$$= p_{tx}(+f_2, t_4)$$
$$= p_{tx}(-f_2, t_3)$$
$$= 0$$

Desirably the transmission pilot signal satisfies a condition of an equation (82):

$$P_{tx}(f_1) = \mu P_{tx}(f_2) \text{ ($\mu$ is any complex coefficient)} \tag{82}$$

When the transmission pilot signal satisfies the condition of the equation (82), similarly to the second embodiment, the transfer characteristic in which the transmission IQ imbalance is already removed can directly be estimated from the reception pilot signal. That is, as shown by the following equation, the reception pilot signal $P_{rx}(f_k)$ is directly supplied as the transfer characteristic matrix $C'(f_k)$ without performing the processing of the equation (68), and the equation (70) can be computed:

$$C'(f_k) = P_{rx}(f_k) \text{ } (k=1, 2)$$

In such cases, the transfer characteristic estimating unit 1107 can be eliminated in the wireless communication apparatus 1003, and the receiver computation amount and the circuit scale can be reduced.

Sixth Embodiment

In a wireless communication apparatus 1003 according to a sixth embodiment of the invention, the pilot signals are produced in the wireless communication apparatus 1003, and the transmission IQ imbalance characteristic is estimated using the pilot signals. Additionally, in the wireless communication apparatus 1003, the pre-compensation of the transmission IQ imbalance is performed to the signal transmitted to the wireless communication apparatus 1001 according to the estimated transmission IQ imbalance characteristic.

The wireless communication apparatus 1003 of FIG. 10 will be described with reference to FIG. 14. The wireless communication apparatus 1003 includes a pilot signal generating unit 1401, a transmission signal generating unit 1402, a wireless transmission unit 1403 having a quadrature modulator, a switch 1404, a wireless reception unit 1405 having a quadrature demodulator, a frequency separation unit 1406, a transfer characteristic estimating unit 1407, a reception IQ imbalance removing unit 1408, a transmission IQ imbalance estimating unit 1409, and a reception processing unit 1410.

The wireless communication apparatus 1003 has three kinds of modes, that is, (A) a pre-processing mode, (B) a reception processing mode, and (C) a transmission processing mode, and the wireless communication apparatus 1003 performs different pieces of processing according to the modes. The processing performed by the wireless communication apparatus 1003 in each mode will be described below.

(A) Operation in Pre-Processing Mode

The wireless communication apparatus 1003 performs the following pre-processing before making a transition to the transmission processing mode. When the wireless communication apparatus 1003 makes the transition to the pre-processing mode, the pilot signal generating unit 1401 produces a digital signal S1401 in which transmission pilot signals are allocated to plural frequency components, and the pilot signal generating unit 1401 supplies the produced digital signal S1401 to the wireless transmission unit 1403. The wireless transmission unit 1403 converts the digital signal S1401 into an analog signal, and performs the frequency conversion of the analog signal into a signal having a radio-frequency band (RF), thereby producing an RF signal S1403. The RF signal S1403 supplied from the wireless transmission unit 1403 is fed into the switch 1404.

In the pre-processing mode, the switch 1404 connects a terminal T2 and a terminal T3 to feed the RF signal S1403 supplied from the wireless transmission unit 1403 into the wireless reception unit 1405. In the sixth embodiment, a channel characteristic shall mean a characteristic in which a frequency characteristic of the wireless transmission unit 1403, a frequency characteristic possessed by a channel from the wireless transmission unit 1403 to the wireless reception unit 1405, and a frequency characteristic of the wireless reception unit 1405 are combined. Although not shown, a unit (such as an analog filter) may be inserted in one of the wireless transmission unit 1403, the channel from the wireless transmission unit 1403 to the wireless reception unit 1405, and the wireless reception unit 1405 to additionally impart a frequency characteristic.

The wireless reception unit 1405 performs the frequency conversion of the RF signal S1403 supplied from the wireless transmission unit 1403 into the baseband signal, and converts the baseband signal into a digital signal S1406.

It is not always necessary that the wireless transmission unit 1403 and the wireless reception unit 1405 individually have the oscillators, but one oscillator may be shared by the wireless transmission unit 1403 and the wireless reception unit 1405.

The digital signal S1406 supplied from the wireless reception unit 1405 is fed into the frequency separation unit 1406. The frequency separation unit 1406 separates the digital signal S1406 into reception pilot signals S1407 in each frequency component, and supplies the reception pilot signals S1407 to the transfer characteristic estimating unit 1407. In the frequency separation unit 1406, a well-known technique in which FFT or a filter bank is used can be adopted to separate the signal in each frequency component.

The transfer characteristic estimating unit 1407 estimates the transfer characteristic from the reception pilot signal S1407. The transmission IQ imbalance generated in the wireless transmission unit 1403, the channel characteristic, and the reception IQ imbalance generated in the wireless reception unit 1405 are combined in the transfer characteristic. The transfer characteristic estimating unit 1407 supplies information S1408 to the transmission IQ imbalance removing unit 1408. The information S1408 indicates the transfer characteristic estimated by the transfer characteristic estimating unit 1407.

The reception IQ imbalance removing unit 1408 produces the transfer characteristic in which the influence of the reception IQ imbalance is removed, and supplies a signal S1409 indicating the transfer characteristic to the transmission IQ imbalance estimating unit 1409.

The transmission IQ imbalance estimating unit 1409 estimates the transmission IQ imbalance characteristic from the transfer characteristic, supplies a signal S1410 indicating the transmission IQ imbalance characteristic to the transmission signal generating unit 1402.

Figure 14:
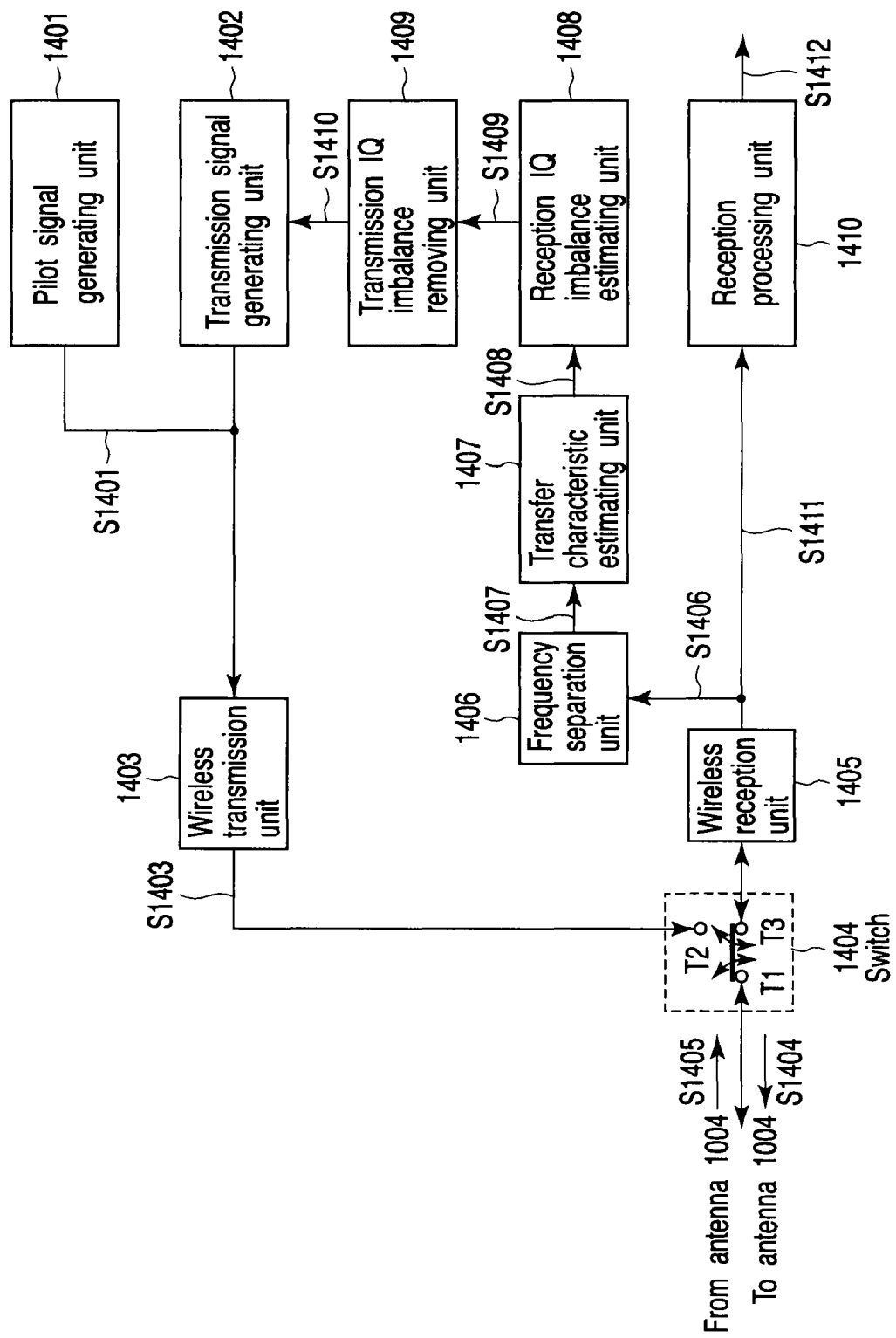
FIG. 14 shows a configuration of a wireless communication apparatus according to the sixth embodiment.

In the sixth embodiment, the operation in the pre-processing mode of the wireless communication apparatus 1003 is similar to that of FIG. 14 (fifth embodiment) except for the reception IQ imbalance removing unit 1408 and the transmission IQ imbalance estimating unit 1409.

The detailed processing performed by each of the reception IQ imbalance removing unit 1408 and transmission IQ imbalance estimating unit 1409 of the sixth embodiment will be described below.

Using transfer characteristic matrix estimate values $C'(f_1)$ and $C'(f_2)$ concerning the frequencies $\pm f_1$ and $\pm f_2$, the reception IQ imbalance removing unit 1408 produces the transfer characteristic in which the influence of the reception IQ imbalance is removed. The transfer characteristic matrix estimate values $C'(f_1)$ and $C'(f_2)$ are supplied from the transfer characteristic estimating unit 1407. Assuming that B is the transfer characteristic in which the influence of the reception IQ imbalance is removed, the reception IQ imbalance removing unit 1408 computes the transfer characteristic matrix B from an equation (84):

$$B = \{C'(f_1)\}^{-1} C'(f_2) \tag{83}$$

The reception IQ imbalance removing unit 1408 supplies a signal S1409 indicating the transfer characteristic matrix B computed by the equation (83) to the transmission IQ imbalance estimating unit 1409.

The processing performed by the transmission IQ imbalance estimating unit 1409 will be described below. Using the transfer characteristic matrix B supplied from the reception IQ imbalance removing unit 1408, the transmission IQ imbalance estimating unit 1409 computes two eigenvectors concerning the transfer characteristic matrix B.

In the following description, the two eigenvectors computed from the transfer characteristic matrix B are expressed as follows:

$$W_1 = [w_1(1) \, w_1(2)]^T$$

$$W_2 = [w_2(1) \, w_2(2)]^T$$

Then, the transmission IQ imbalance estimating unit 1409 estimates the transmission IQ imbalance matrix $Q_{tx}$ from the two eigenvectors $W_1$ and $W_2$. The transmission IQ imbalance estimating unit 1409 computes the inverse matrix estimate value $Q'^{-1}_{tx}$ of the transmission IQ imbalance matrix $Q_{tx}$ when the condition of $|w_1(1)| > |w_1(2)|$ is satisfied for the eigenvector $W_1$ (or when the condition of $|w_2(2)| > |w_2(1)|$ is satisfied for the eigenvector $W_2$):

$$Q'^{-1}_{tx} = [W_1 \, W_2](|w_1(1)| > |w_1(2)| \text{ or } |w_2(2)| > |w_2(1)|) \tag{84}$$

On the other hand, the transmission IQ imbalance estimating unit 1409 computes the inverse matrix estimate value $Q'^{-1}_{tx}$ of the transmission IQ imbalance matrix $Q_{tx}$ when the condition of $|w_1(2)| \geq |w_1(1)|$ is satisfied for the eigenvector $W_1$ (or when the condition of $|w_2(1)| \geq |w_2(2)|$ is satisfied for the eigenvector $W_2$):

$$Q'^{-1}_{tx} = [W_2 \, W_1](|w_1(2)| \geq |w_1(1)| \text{ or } |w_2(1)| < |w_2(2)|) \tag{85}$$

The transmission IQ imbalance estimating unit 1409 supplies the signal S1410 to the transmission signal generating unit 1402. The signal S1410 indicates the transmission IQ imbalance inverse matrix estimate value $Q'^{-1}_{tx}$ computed by the equation (84) or (85).

When $C'(f_1) = C'(f_2)$ holds in the transfer characteristic matrix estimate values supplied from the transfer characteristic estimating unit 1407, the transfer characteristic matrix B becomes a unit matrix by the equation (83). In such cases, unfortunately the eigenvectors of the matrix B cannot uniquely be obtained. As described above, in the case where the unit is inserted in one of the wireless transmission unit 1403, the channel from the wireless transmission unit 1403 to the wireless reception unit 1405, and the wireless reception unit 1405 to additionally impart the frequency characteristic, a probability of obtaining $C'(f_1) = C'(f_2)$ can be suppressed to a low level, and thereby the eigenvectors can uniquely be obtained.

(B) Operation in Reception Processing Mode

When the radio-frequency band signal transmitted from the wireless communication apparatus 1001 is received through the receiving antenna 1004, the wireless communication apparatus 1003 makes the transition to the reception processing mode to perform the following processing.

The radio-frequency band signal S1405 received through the receiving antenna 1004 is fed into the switch 1404. In the reception processing mode, the switch 1404 connects the terminal T1 and the terminal T3 to feed the radio-frequency band signal S1405 into the wireless reception unit 1405.

The wireless reception unit 1405 performs the frequency conversion of the radio-frequency band signal S1405 fed from the switch 1404 into the baseband signal, and converts the baseband signal into the digital signal S1411. Then, the wireless reception unit 1405 supplies the digital signal S1411 to the reception processing unit 1410.

The reception processing unit 1410 supplies reproduction data S1412 of transmission data by performing reception processing (such as channel estimate, channel equalization, and decoding processing) matched with the frame configuration or transmission method of the signal to the digital signal S1411.

In the case where the reception processing unit 1410 includes the frequency separation unit such as the FFT unit, the frequency separation unit 1406 used in the pre-processing mode can be replaced by the frequency separation unit included in the reception processing unit 1410.

(C) Operation in Transmission Processing Mode

When transmitting the signal to the wireless communication apparatus 1001, the wireless communication apparatus 1003 makes the transition to the transmission processing mode to perform the following processing.

The transmission signal generating unit 1402 produces a digital signal having any frame configuration or transmission method in order to transmit the digital signal to the wireless communication apparatus 1001. The transmission signal generating unit 1402 performs pre-compensation of the transmission IQ imbalance to the produced digital signal according to the transmission IQ imbalance characteristic inverse matrix $Q'^{-1}_{tx}$ supplied from the transmission IQ imbalance estimating unit 1409. The pre-compensation of the transmission IQ imbalance is expressed by an equation (86):

$$X'(t) = Q'^{-1}_{tx} X(t) \tag{86}$$

Where X'(t) is a vector given by an equation (87) using a digital signal of $x(t) = x_I(t) + j x_Q(t)$ at a time t before the transmission IQ imbalance is compensated ($x_I(t)$ and $x_Q(t)$ are the in-phase component signal and the orthogonal component signal, respectively, before the transmission IQ imbalance is compensated):

$$X(t) = \begin{bmatrix} x(t) \\ \{x(t)\}^* \end{bmatrix} \tag{87}$$

X'(t) is a vector given by an equation (88) using a digital signal of $x'(t) = x'_I(t) + j x'_Q(t)$ at the time t in which the transmission IQ imbalance is already compensated ($x'_I(t)$ and $x'_Q(t)$ are the in-phase component signal and the orthogonal component signal, respectively, in which the transmission IQ imbalance is already compensated):

$$X'(t) = \begin{bmatrix} x'(t) \\ \{x'(t)\}^* \end{bmatrix} \quad (88)$$

The transmission signal generating unit 1402 supplies the digital signal S1402 in which the transmission IQ imbalance is already compensated to the wireless transmission unit 1403. The wireless transmission unit 1403 converts the digital signal S1402 into an analog signal, and performs the frequency conversion of the analog signal into the radio-frequency band signal to produce the RF signal S1403. The RF signal S1403 is fed into the switch 1404. In the transmission processing mode, the switch 1404 connects the terminal T1 and the terminal T2, and supplies the RF signal S1403 from the wireless transmission unit 1403 to the antenna 1004 in the form of the transmission signal S1404. The transmission signal S1404 is transmitted through the transmitting antenna 1004.

Effect of Sixth Embodiment

Thus, in the wireless communication apparatus 1003 of the sixth embodiment, the transfer characteristics concerning the two pilot signal pairs in the frequency components symmetrically located in relation to the center frequency are estimated, the influence of the reception IQ imbalance is removed using the estimated two transfer characteristic pairs, and the transmission IQ imbalance characteristic is estimated. Therefore, the transmission IQ imbalance characteristic can be estimated with high accuracy without an influence of an error caused by the reception IQ imbalance.

In the wireless communication apparatus 1003 of the sixth embodiment, the pilot signals are produced in the wireless communication apparatus 1003, and the transmission IQ imbalance characteristic is estimated using the pilot signals. Therefore, the transmission IQ imbalance characteristic can be estimated by the individual wireless communication apparatus 1003 without the use of the signal from another wireless communication apparatus.

In the case where one oscillator is shared by the wireless transmission unit 1403 and the wireless reception unit 1405, a frequency error (frequency offset) is not generated between the wireless transmission unit and the wireless reception unit, so that the transmission IQ imbalance characteristic can be estimated without the influence of the error caused by the frequency offset.

The transmission IQ imbalance compensation is previously performed to the transmission signal according to the estimated transmission IQ imbalance characteristic, which allows the wireless communication apparatus 1003 to transmit the signal having highly-accurate modulation. As a result, the reception accuracy can be improved in the wireless communication apparatus 1001.

(Modifications)

As for the pilot signals of the sixth embodiment, as shown in FIG. 12, the two pilot signals symmetrically located in relation to the center frequency may be transmitted at different times.

The pilot signals shown in FIG. 13 satisfy the condition of the equation (80), desirably the conditions of the equations (81) and (82). In the case where the transmission pilot signal satisfies the condition of the equation (82), similarly to the second embodiment, the transfer characteristic estimating unit 1507 can be eliminated in the wireless communication apparatus 1003.

Figure 15:
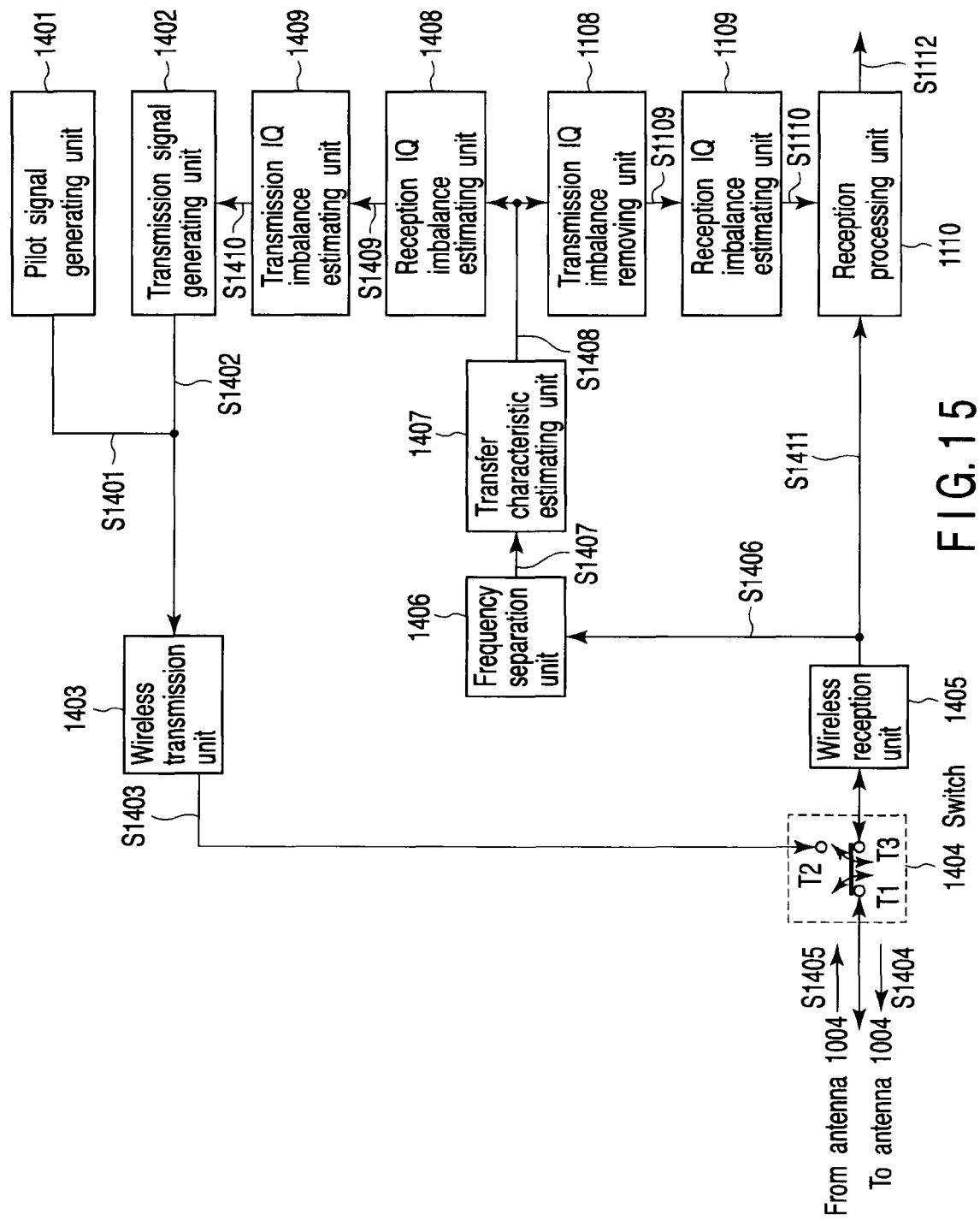
FIG. 15 shows a configuration of a wireless communication apparatus provided with a function of a wireless communication apparatus according to the fifth and sixth embodiments.

As shown in FIG. 15, a configuration of the wireless communication apparatus 1003 may be configured by combining the configurations of the fifth and sixth embodiments.

The wireless communication apparatus 1003 of FIG. 15 can estimate and compensate the transmission IQ imbalance and reception IQ imbalance, which are generated in the wireless transmission unit 1403 and wireless reception unit 1405, respectively.

Thus, according to the first to sixth embodiments of the invention, the transfer characteristics are estimated for the two pilot signal pairs in the frequency components symmetrically located in relation to the center frequency. Then, the influences of the reception/transmission IQ imbalance are removed using the estimated two transfer characteristic pairs, and the reception/transmission IQ imbalance characteristics (the IQ imbalance characteristic caused by the quadrature modulation and the IQ imbalance characteristic caused by the quadrature modulation) are estimated. Therefore, the reception/transmission IQ imbalance characteristics can be estimated with high accuracy without the influences of the errors caused by the reception/transmission IQ imbalance.

Additionally, the reception data signal is compensated using the reception/transmission IQ imbalance characteristics estimated with high accuracy, so that demodulation accuracy of the reception data signal can largely be improved.

What is claimed is:

1. A wireless communication method comprising:
generating a first transmission signal including (a) a first pilot signal sequence and a second pilot signal sequence which are allocated to a first frequency and a second frequency symmetrically located in relation to a center frequency of a plurality of frequencies, and (b) a third pilot signal sequence and a fourth pilot signal sequence which are allocated to a third frequency and a fourth frequency symmetrically located in relation to the center frequency;
performing quadrature modulation on the first transmission signal with a quadrature modulator, to obtain a first quadrature modulation signal;
transmitting the first quadrature modulation signal;
performing quadrature demodulation on the first quadrature modulation signal received with a quadrature demodulator, to obtain a first reception signal;
extracting, from the first reception signal, the first pilot signal sequence, the second pilot signal sequence, the third pilot signal sequence, and the fourth pilot signal sequence;
estimating a first transfer characteristic concerning the first frequency and the second frequency by using the first pilot signal sequence and the second pilot signal sequence;
estimating a second transfer characteristic concerning the third frequency and the fourth frequency using the third pilot signal sequence and the fourth pilot signal sequence;
generating a third transfer characteristic from which an influence of transmission IQ imbalance in the quadrature modulator is removed by using the first transfer characteristic and the second transfer characteristic; and
estimating, from the third transfer characteristic, a reception IQ imbalance characteristic in the quadrature demodulator.

2. The method according to claim 1, further comprising:
generating a fourth transfer characteristic from which reception IQ imbalance in the quadrature demodulation is removed by using the first transfer characteristic and the second transfer characteristic; and estimating, from the fourth transfer characteristic, a transmission IQ imbalance characteristic in the quadrature modulation.

3. The method according to claim 2, wherein the first transmission signal includes a transmission data signal allocated to at least one frequency different from the first to fourth frequencies in the frequencies, and the method further comprises:

compensating a reception data signal corresponding to the first reception signal or the transmission data signal in the first reception signal for reception IQ imbalance in the quadrature demodulator and transmission IQ imbalance in the quadrature modulator, according to the reception IQ imbalance characteristic and the transmission IQ imbalance characteristic; and decoding the reception data signal compensated for the reception IQ imbalance and the transmission IQ imbalance.

4. The method according to claim 2, further comprising:

generating a second transmission signal including a transmission data signal;

performing quadrature modulation on the second transmission signal with the quadrature modulator, to obtain a second quadrature modulation signal;

transmitting the second quadrature modulation signal at a time which is different from a time the first quadrature modulation signal is transmitted;

performing quadrature demodulation on the second quadrature modulation signal received with the quadrature demodulator, to obtain a second reception signal;

compensating a reception data signal corresponding to the second reception signal or the transmission data signal in the second reception signal for reception IQ imbalance in the quadrature demodulator and transmission IQ imbalance in the quadrature modulator, according to the reception IQ imbalance characteristic and the transmission IQ imbalance characteristic; and decoding the reception data signal compensated for the reception IQ imbalance and transmission IQ imbalance.

5. The method according to claim 2, further comprising:

generating a second transmission signal including a transmission data signal;

pre-compensating the second transmission signal for transmission IQ imbalance in the quadrature modulator, according to the transmission IQ imbalance characteristic;

performing quadrature modulation on the second transmission signal pre-compensated for the transmission IQ imbalance with the quadrature modulator, to obtain a second quadrature modulation signal; and transmitting the second quadrature modulation signal.

6. The method according to claim 1, wherein the first transmission signal includes a transmission data signal allocated to at least one frequency different from the first to fourth frequencies in the frequencies, and the method further comprises:

compensating a reception data signal corresponding to the first reception signal or the transmission data signal in the first reception signal for reception IQ imbalance in the quadrature demodulator, according to the reception IQ imbalance characteristic; and decoding the reception data signal compensated for the reception IQ imbalance.

7. The method according to claim 1, further comprising:

generating a second transmission signal including a transmission data signal;

performing quadrature modulation on the second transmission signal with the quadrature modulator, to obtain a second quadrature modulation signal;

transmitting the second quadrature modulation signal at a time which is different from a time the first quadrature modulation signal is transmitted;

performing quadrature demodulation on the second quadrature modulation signal received with the quadrature demodulator, to obtain a second reception signal;

compensating a reception data signal corresponding to the second reception signal or the transmission data signal in the second reception signal for reception IQ imbalance in the quadrature demodulator, according to the reception IQ imbalance characteristic; and decoding the reception data signal compensated for the reception IQ imbalance.

8. A wireless communication method comprising:

generating a first transmission signal including (a) a first pilot signal sequence and a second pilot signal sequence which are allocated to a first frequency and a second frequency symmetrically located in relation to a center frequency of a plurality of frequencies, and (b) a third pilot signal sequence and a fourth pilot signal sequence which are allocated to a third frequency and a fourth frequency symmetrically located in relation to the center frequency;

performing quadrature modulation on the first transmission signal with a quadrature modulator, to obtain a first quadrature modulation signal;

transmitting the first quadrature modulation signal;

performing quadrature demodulation on the first quadrature modulation signal received with a quadrature demodulator, to obtain a first reception signal;

extracting, from the first reception signal, the first pilot signal sequence, the second pilot signal sequence, a third pilot signal sequence, and the fourth reception pilot signal sequence;

estimating a first transfer characteristic concerning the first frequency and the second frequency by using the first pilot signal sequence and the second pilot signal sequence;

estimating a second transfer characteristic concerning the third frequency and the fourth frequency by using the third pilot signal sequence and the fourth pilot signal sequence;

generating a third transfer characteristic from which an influence of reception IQ imbalance in the quadrature demodulator is removed by using the first transfer characteristic and the second transfer characteristic; and estimating, from the third transfer characteristic, a transmission IQ imbalance characteristic in the quadrature modulator.

9. The method according to claim 8, further comprising:

generating a second transmission signal including a transmission data signal;

pre-compensating the second transmission signal for transmission IQ imbalance in the quadrature modulator, according to the transmission IQ imbalance characteristic;

performing quadrature modulation on the second transmission signal pre-compensated for the transmission IQ imbalance with the quadrature modulator, to obtain a second quadrature modulation signal; and transmitting the second quadrature modulation signal.

10. A wireless communication apparatus comprising:

a receiver to receive a first quadrature modulation signal including (a) a first pilot signal sequence and a second pilot signal sequence which are allocated to a first frequency and a second frequency symmetrically located in relation to a center frequency of a plurality of frequencies, and (b) a third pilot signal sequence and a fourth pilot signal sequence which are allocated to a third frequency and a fourth frequency symmetrically located in relation to the center frequency;
a quadrature demodulator to perform quadrature demodulation on the first quadrature modulation signal, to obtain a first reception signal;
an extracting unit configured to extract, from the first reception signal, the first pilot signal sequence, the second pilot signal sequence, the third pilot signal sequence, and the fourth pilot signal sequence;
an estimating unit configured to estimate a first transfer characteristic concerning the first frequency and the second frequency by using the first pilot signal sequence and the second pilot signal sequence which are extracted, and to estimate a second transfer characteristic concerning the third frequency and the fourth frequency by using the third pilot signal sequence and the fourth pilot signal sequence which are extracted;
a first generation unit configured to generate a third transfer characteristic from which an influence of transmission IQ imbalance in the quadrature modulator is removed, by using the first transfer characteristic and the second transfer characteristic; and
a reception IQ imbalance estimating unit configured to estimate, from the third transfer characteristic, a reception IQ imbalance characteristic in the quadrature demodulator.

11. The apparatus according to claim 10, further comprising:
a second generation unit configured to generate a fourth transfer characteristic from which an influence of reception IQ imbalance in the quadrature demodulator is removed, by using the first transfer characteristic and the second transfer characteristic; and
a transmission IQ imbalance estimating unit configured to estimate, from the fourth transfer characteristic, a transmission IQ imbalance characteristic in a quadrature modulator.

12. The apparatus according to claim 11, further comprising:
a transmission signal generating unit configured to generate a transmission signal;
a pre-compensation unit configured to pre-compensate the transmission signal for transmission IQ imbalance according to the transmission IQ imbalance characteristic;
a modulator to perform quadrature modulation on the transmission signal pre-compensated for the transmission IQ imbalance, to obtain a second quadrature modulation signal; and
a transmitter to transmit the second quadrature modulation signal.

13. The apparatus according to claim 11, wherein the quadrature modulation signal includes a transmission data signal allocated to at least one frequency different from the first to fourth frequencies in the frequencies, and
the apparatus further comprises:
a compensation unit configured to compensate the first reception signal or the transmission data signal in the first reception signal for reception IQ imbalance and transmission IQ imbalance according to the reception IQ imbalance characteristic and the transmission IQ imbalance characteristic, to obtain a reception data signal compensated for the reception IQ imbalance and the transmission IQ imbalance; and
a decoder to decode the reception data signal.

14. The apparatus according to claim 11, wherein the receiver further receive a second quadrature modulation signal including a transmission data signal, and
the quadrature demodulator performs quadrature demodulation on the second quadrature modulation signal, to obtain a second reception signal,
the apparatus further comprises:
a compensation unit configured to compensate the second reception signal or the transmission data signal in the second reception signal for reception IQ imbalance and transmission IQ imbalance according to the reception IQ imbalance characteristic and the transmission IQ imbalance characteristic, to obtain a reception data signal compensated for the reception IQ imbalance and transmission IQ imbalance; and
a decoder to decode the reception data signal.

15. The apparatus according to claim 10, wherein the first pilot signal sequence includes a first pilot signal and a second pilot signal which are allocated to a first time and a second time respectively,
the second pilot signal sequence includes a third pilot signal and a fourth pilot signal which are allocated to the first time and the second time,
the third pilot signal sequence includes a fifth pilot signal and a sixth pilot signal which are allocated to a third time and a fourth time,
the fourth pilot signal sequence includes a seventh pilot signal and an eighth pilot signal which are allocated to the third time and the fourth time.

16. The apparatus according to claim 15, wherein the first pilot signal $p_{tx}(+f_1,t_1)$, the second pilot signal $p_{tx}(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ which are in the first quadrature modulation signal satisfy $$p_{tx}(+f_k,t_{2k-1})\{p_{tx}(-f_k,t_{2k})\}^* - p_{tx}(+f_k,t_{2k})\{p_{tx}(-f_k,t_{2K-1})\}^* \neq 0$$

where $k=\{1, 2\}$, $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

17. The apparatus according to claim 15, wherein the first pilot signal $p_{tx}(+f_1,t_1)$, the second pilot signal $p_{tx}(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ which are in the first quadrature modulation signal satisfy $$p_{tx}(+f_k,t_{2k-1})\{p_{tx}(+f_k,t_{2k})\} + \{p_{tx}(-f_k,t_{2k-1})\}^*\{p_{tx}(-f_k,t_{2K})\}^* = 0$$

where $k=\{1, 2\}$, $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

18. The apparatus according to claim 15, wherein the second pilot signal, the third pilot signal, the sixth pilot signal, and the seventh pilot signal have a value of "0", and the first pilot signal, the fourth pilot signal, the fifth pilot signal, and the eighth pilot signal do not have the value of "0".

19. The apparatus according to claim 15, wherein the first pilot signal $p_{tx}(+f_1,t_1)$, the second pilot signal $p_{tx}(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ which are in the first quadrature modulation signal satisfy $p_{tx}(f_1)=\mu p_{tx}(f_2)$ ($\mu$ is an arbitrary complex coefficient)

$$P_{tx}(f_k) = \begin{bmatrix} p_{tx}(+f_k, t_{2k-1}) & p_{tx}(+f_k, t_{2k}) \\ \{p_{tx}(-f_k, t_{2k-1})\}^* & \{p_{tx}(-f_k, t_{2k})\}^* \end{bmatrix} (k=1,2)$$

where $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

20. The apparatus according to claim 19, wherein the estimating unit
 (a) calculates a matrix $C'(f_1)=P_{rx}(f_1)$ indicating an estimate value of the first transfer characteristic by using the first pilot signal $p_{rx}(+f_1,t_1)$, the second pilot signal $p_{rx}(+f_1,t_2)$, the third pilot signal $p_{rx}(-f_1,t_1)$, and the fourth pilot signal $p_{rx}(-f_1,t_2)$ which are in the first reception signal, $$P_{rx}(f_1) = \begin{bmatrix} p_{rx}(+f_1, t_1) & p_{rx}(+f_1, t_2) \\ \{p_{rx}(-f_1, t_1)\}^* & \{p_{rx}(-f_1, t_2)\}^* \end{bmatrix}$$

where $+f_1$: the first frequency, $-f_1$: the second frequency, $t_1$: the first time, $t_2$: the second time, and *: complex conjugate computation, and
 (b) calculates a matrix $C'(f_2)=P_{rx}(f_2)$ indicating an estimate value of the second transfer characteristic by using the fifth pilot signal $p_{rx}(+f_2,t_3)$, the sixth pilot signal $p_{rx}(+f_2,t_4)$, the seventh pilot signal $p_{rx}(-f_2,t_3)$, and the eighth pilot signal $p_{rx}(-f_2,t_4)$ which are in the first reception signal, $$P_{rx}(f_2) = \begin{bmatrix} p_{rx}(+f_2, t_3) & p_{rx}(+f_2, t_4) \\ \{p_{rx}(-f_2, t_3)\}^* & \{p_{rx}(-f_2, t_4)\}^* \end{bmatrix}$$

where $+f_2$: the third frequency, $-f_2$: the fourth frequency, $t_3$: the third time, $t_4$: the fourth time, and *: complex conjugate computation.

21. The apparatus according to claim 15, wherein the estimating unit calculates a matrix $C'(f_1)$ indicating an estimate value of the first transfer characteristic and a matrix $C'(f_2)$ indicating an estimate value of the second transfer characteristic,
 using (a) the first pilot signal $p_{tx}(+f_1,t_1)$, the second pilot signal ptx $(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ which are in the first quadrature modulation signal, and
 (b) the first pilot signal $p_{rx}(+f_1,t_1)$, the second pilot signal $p_{rx}(+f_1,t_2)$, the third pilot signal $p_{rx}(-f_1,t_1)$, the fourth pilot signal $p_{rx}(-f_1,t_2)$, the fifth pilot signal $p_{rx}(+f_2,t_3)$, the sixth pilot signal $p_{rx}(+f_2,t_4)$, the seventh pilot signal $p_{rx}(-f_2,t_3)$, and the eighth pilot signal $p_{rx}(-f_2,t_4)$ which are in the first reception signal, $C'(f_k) = P_{rx}(f_k)\{P_{tx}(f_k)\}^{-1} (k=1,2)$ $$P_{tx}(f_k) = \begin{bmatrix} p_{tx}(+f_k, t_{2k-1}) & p_{tx}(+f_k, t_{2k}) \\ \{p_{tx}(-f_k, t_{2k-1})\}^* & \{p_{tx}(-f_k, t_{2k})\}^* \end{bmatrix} (k=1,2)$$

$$P_{rx}(f_k) = \begin{bmatrix} p_{rx}(+f_k, t_{2k-1}) & p_{rx}(+f_k, t_{2k}) \\ \{p_{rx}(-f_k, t_{2k-1})\}^* & \{p_{rx}(-f_k, t_{2k})\}^* \end{bmatrix} (k=1,2)$$

where $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

22. The apparatus according to claim 10, wherein the estimating unit calculates, by using a matrix $C'(f_1)$ indicating an estimate value of the first transfer characteristic and a matrix $C'(f_2)$ indicating an estimate value of the second transfer characteristic, a matrix A $A=C'(f_1)\{C'(f_2)\}^{-1}$ which indicates the third transfer characteristic.

23. The apparatus according to claim 22, wherein the reception IQ imbalance estimating unit
 (a) calculates two eigenvectors $V_1$ and $V_2$ of the matrix A indicating the third transfer characteristic $V_1=[v_1(1)v_2(2)]^T$ $V_2=[v_2(1)v_2(2)]^T$, and (b) calculates matrix $Q'_{rx}$ indicating an estimate value of the reception IQ imbalance characteristic from the eigenvectors $V_1$ and $V_2$ $Q'_{rx}=[V_1 V_2]$ where $|v_1(1)|>|v_1(2)|$ or $|v_2(2)|>|v_2(1)|$ $Q'_{rx}=[V_2 V_1]$ where $|v_1(2)|\geq|v_1(1)|$ or $|v_2(1)|\geq|v_2(2)|$.

24. The apparatus according to claim 10, wherein the first quadrature modulation signal includes a transmission data signal allocated to at least one frequency different from the first to fourth frequencies in the frequencies, and
 the apparatus further comprises:
 a first compensation unit configured to compensate the first reception signal or the transmission data signal in the first reception signal for reception IQ imbalance according to the reception IQ imbalance characteristic, to obtain a reception data signal compensated for the reception IQ imbalance; and
 a decoder to decode the reception data signal.

25. The apparatus according to claim 10, wherein the receiver further receive a second quadrature modulation signal including a transmission data signal, and
 the quadrature demodulator performs quadrature demodulation on the second quadrature modulation signal, to obtain a second reception signal,
 the apparatus further comprises:
 a first compensation unit configured to compensate the second reception signal or the transmission data signal in the second reception signal for reception IQ imbalance according to the reception IQ imbalance characteristic, to obtain a reception data signal compensated for the reception IQ imbalance; and
 a decoder to decode the reception data signal.

26. A wireless communication apparatus comprising:
a reception unit configured to receive a first quadrature modulation signal including (a) a first pilot signal sequence and a second pilot signal sequence which are allocated to a first frequency and a second frequency symmetrically located in relation to a center frequency of a plurality of frequencies, and (b) a third pilot signal sequence and a fourth pilot signal sequence which are allocated to a third frequency and a fourth frequency symmetrically located in relation to the center frequency;
a quadrature demodulator to perform quadrature demodulation on the first quadrature modulation signal, to obtain a reception signal;
an extracting unit configured to extract, from the reception signal, the first pilot signal sequence, the second pilot signal sequence, the third pilot signal sequence, and the fourth pilot signal sequence;
an estimating unit configured to estimate a first transfer characteristic concerning the first frequency and the second frequency by using the first pilot signal sequence and the second pilot signal sequence which are extracted, and to estimate a second transfer characteristic concerning the third frequency and the fourth frequency by using the third pilot signal sequence and the fourth pilot signal sequence which are extracted;
a generation unit configured to generate a third transfer characteristic from which an influence of reception IQ imbalance in the quadrature demodulator is removed, by using the first transfer characteristic and the second transfer characteristic; and
a transmission IQ imbalance estimating unit configured to estimate, from the third transfer characteristic, a transmission IQ imbalance characteristic in a quadrature modulator.

27. The apparatus according to claim 26, wherein the estimating unit calculates, by using a matrix $C'(f_1)$ indicating the estimate value of the first transfer characteristic and a matrix $C'(f_2)$ indicating the estimate value of the second transfer characteristic, a matrix B $$B=\{C'(f_1)\}^{-1}C'(f_2)$$

which indicates the third transfer characteristic.

28. The apparatus according to claim 27, wherein the transmission IQ imbalance estimating unit
(a) calculates two eigenvectors $W_1$ and $W_2$ of the matrix B indicating the third transfer characteristic $$W_1=[w_1(1) w_1(2)]^T$$

$$W_2=[w_2(1) w_2(2)]^T, \text{ and}$$

(b) calculates matrix $Q'_{tx}$ indicating an estimate value of the transmission IQ imbalance characteristic from the eigenvectors $W_1$ and $W_2$ $$Q'_{tx}=[W_1 W_2]^{-1}$$

where $|w_1(1)|>|w_1(2)|$ or $|w_2(2)|>|w_2(1)|$ $$Q'_{tx}=[W_2 W_1]^{-1}$$

where $|w_1(2)|\geq|w_1(1)|$ or $|w_2(1)|\geq|w_2(2)|$.

29. A wireless communication apparatus comprising:
a generation unit configured to generate a transmission signal including (a) a first pilot signal sequence and a second pilot signal sequence which are allocated to a first frequency and a second frequency symmetrically located in relation to a center frequency of a plurality of frequencies, and (b) a third pilot signal sequence and a fourth pilot signal sequence which are allocated to a third frequency and a fourth frequency symmetrically located in relation to the center frequency,
the first pilot signal sequence including a first pilot signal and a second pilot signal which are allocated to a first time and a second time,
the second pilot signal sequence including a third pilot signal and a fourth pilot signal which are allocated to the first time and the second time,
the third pilot signal sequence including a fifth pilot signal and a sixth pilot signal which are allocated to a third time and a fourth time,
the fourth pilot signal sequence including a seventh pilot signal and an eighth pilot signal which are allocated to the third time and the fourth time;
a quadrature modulator to perform quadrature modulation on the transmission signal, to obtain a quadrature modulation signal; and
a transmitter to transmit the quadrature modulation signal.

30. The apparatus according to claim 29, wherein the first pilot signal $p_{tx}(+f_1,t_1)$, the second pilot signal $p_{tx}(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ satisfy $$p_{tx}(+f_k,t_{2k-1})\{p_{tx}(-f_k,t_{2k})\}^* - p_{tx}(+f_k,t_{2k})\{p_{tx}(-f_k,t_{2k-1})\}^* \neq 0$$

where $k=\{1, 2\}$, $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

31. The apparatus according to claim 29, wherein the first pilot signal $p_{tx}(+f_1,t_1)$, the second pilot signal $p_{tx}(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ satisfy $$p_{tx}(+f_k,t_{2k-1})p_{tx}(+f_k,t_{2k}) + \{p_{tx}(-f_k,t_{2k-1})\}^*\{p_{tx}(-f_k,t_{2k})\}^* = 0$$

where $k=\{1, 2\}$, $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

32. The apparatus according to claim 29, wherein the second pilot signal, the third pilot signal, the sixth pilot signal, and the seventh pilot signal have a value of "0", and the first pilot signal, the fourth pilot signal, the fifth pilot signal, and the eighth pilot signal do not have the value of "0".

33. The apparatus according to claim 29, wherein the first pilot signal $p_{tx}(+f_1,t_1)$, the second pilot signal $p_{tx}(+f_1,t_2)$, the third pilot signal $p_{tx}(-f_1,t_1)$, the fourth pilot signal $p_{tx}(-f_1,t_2)$, the fifth pilot signal $p_{tx}(+f_2,t_3)$, the sixth pilot signal $p_{tx}(+f_2,t_4)$, the seventh pilot signal $p_{tx}(-f_2,t_3)$, and the eighth pilot signal $p_{tx}(-f_2,t_4)$ satisfy $P_{tx}(f_1) = \mu P_{tx}(f_2)$ (μ is an arbitrary complex coefficient)

$$P_{tx}(f_k) = \begin{bmatrix} p_{tx}(+f_k, t_{2k-1}) & p_{tx}(+f_k, t_{2k}) \\ \{p_{tx}(-f_k, t_{2k-1})\}^* & \{p_{tx}(-f_k, t_{2k})\}^* \end{bmatrix} (k = 1, 2) \quad 5$$

where $+f_1$: the first frequency, $-f_1$: the second frequency, $+f_2$: the third frequency, $-f_2$: the fourth frequency, $t_1$: the first time, $t_2$: the second time, $t_3$: the third time, $t_4$: the fourth time, and *: complex conjugate computation.

* * * * *